US012793160B2

(12) United States Patent
S et al.

(10) Patent No.: US 12,793,160 B2
(45) Date of Patent: Nov. 10, 2026

(54) DYNAMIC GRAPHICS PROCESSOR TIMEOUTS

(71) Applicant: QUALCOMM Incorporated, San Diego, CA (US)

(72) Inventors: Krishnaprasad S, Perumbavoor (IN); Mayukh Roy, Hyderabad (IN); Dilli Babu Chowdary Sakamuri, Hyderabad (IN); Hemanth Yerva, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/439,251

(22) Filed: Feb. 12, 2024

(65) Prior Publication Data

US 2025/0259259 A1 Aug. 14, 2025

(51) Int. Cl.
*G06K 9/00* (2022.01)
*G06F 3/01* (2006.01)
(Continued)

(52) U.S. Cl.
CPC ................ *G06T 1/20* (2013.01); *G06F 3/012* (2013.01); *G09G 3/001* (2013.01);
(Continued)

(58) Field of Classification Search
CPC ........................................................ G06T 1/20
See application file for complete search history.

(56) References Cited

U.S. PATENT DOCUMENTS 6,700,934 B2 * 3/2004 Lin ........................ H04N 19/65 375/240.16
8,797,340 B2 * 8/2014 Slavenburg .............. G09G 5/12 345/589

(Continued)

FOREIGN PATENT DOCUMENTS

GB 2579112 A * 6/2020 ........... G06F 9/5027
WO WO-2014168740 A2 * 10/2014 ............. G06T 11/10

OTHER PUBLICATIONS

GPU Scheduling for Short Tasks in Private Cloud, Jialun Shao et al., IEEE, 2019, pp. 215-220 (Year: 2019).*

(Continued)

*Primary Examiner* — Jayesh A Patel
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for dynamic graphics processor timeouts. A processor configures a set of graphics processor timeout values for a set of color fields for a first frame, where a sum of the set is less than or equal to a threshold graphics processor timeout value and detects, based on the set of graphics processor timeout values, that a graphics processor timeout has occurred with respect to color field(s). The processor performs, based on the detection and a head pose of a user, an adjustment to timeout value(s) that the sum remains less than or equal to the threshold graphics processor timeout value or a retrieval of a set of motion vectors for a second (Continued)

frame, where the second frame is prior to the first frame. The processor outputs an indication of the adjustment or the retrieval.

20 Claims, 15 Drawing Sheets

(51) Int. Cl.
*G06T 1/20* (2006.01)
*G09G 3/00* (2006.01)
(52) U.S. Cl.
CPC ............... *G09G 2320/0242* (2013.01); *G09G 2320/0261* (2013.01); *G09G 2354/00* (2013.01)

(56) References Cited

U.S. PATENT DOCUMENTS

| | | | | |
|---|---|---|---|---|
| 8,811,730 | B1 * | 8/2014 | Watson | H04N 1/644<br>382/162 |
| 10,491,651 | B2 * | 11/2019 | Wu | H04L 65/612 |
| 10,769,747 | B2 * | 9/2020 | Babu | G06F 3/011 |
| 2006/0114539 | A1 * | 6/2006 | Childers | H04N 9/3126<br>345/589 |
| 2009/0300459 | A1 * | 12/2009 | Fukuoka | H04L 1/1825<br>714/751 |
| 2013/0174144 | A1 * | 7/2013 | Cheng | G06T 1/20<br>718/1 |
| 2014/0092150 | A1 * | 4/2014 | Slavenburg | G09G 5/001<br>345/698 |
| 2015/0371355 | A1 * | 12/2015 | Chen | G09G 5/363<br>345/505 |
| 2016/0042488 | A1 * | 2/2016 | Campbell | G09G 5/363<br>345/506 |
| 2016/0238852 | A1 * | 8/2016 | Ellsworth | G09G 5/006 |
| 2017/0295373 | A1 * | 10/2017 | Zhang | G06T 19/006 |
| 2019/0051229 | A1 * | 2/2019 | Ozguner | G09G 3/2003 |
| 2021/0200255 | A1 * | 7/2021 | Alla | G06F 1/324 |
| 2023/0188768 | A1 * | 6/2023 | Satpute | H04N 21/23418<br>725/116 |
| 2023/0368325 | A1 * | 11/2023 | Kemisetti | G06F 1/3287 |

OTHER PUBLICATIONS

Reducing GPU Offload Latency via Fine-Grained CPU-GPU Synchronization, Daniel Lustig et al., IEEE, 2013, pp. 1-12 (Year: 2013).*

Recognition of Simple Head Gestures Based on Head Pose Estimation Analysis, George Galanakis et al., IARIA, 2014, pp. 88-96 (Year: 2014).*

A Predictive Shutdown Technique for GPU Shader Processors, Po-Han Wang et al., IEEE, Jan. 2009, pp. 9-12 (Year: 2009).*

* cited by examiner

DYNAMIC GRAPHICS PROCESSOR TIMEOUTS

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques pertaining to late stage reprojection (LSR) may be prone to color bleed issues in displayed frames. There is a need for improved techniques pertaining to LSR.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes a memory; and a processor coupled to the memory and, based on information stored in the memory, the processor is configured to: configure a set of graphics processor timeout values for a set of color fields for a first frame, where a sum of the set of graphics processor timeout values is less than or equal to a threshold graphics processor timeout value; detect, based on the set of graphics processor timeout values, that a graphics processor timeout has occurred with respect to at least one color field in the set of color fields; perform, based on the detection and a head pose of a user, (1) an adjustment to at least one timeout value in the set of graphics processor timeout values such that the sum of the set of graphics processor timeout values remains less than or equal to the threshold graphics processor timeout value or (2) a retrieval of a set of motion vectors for a second frame, where the second frame is prior to the first frame; and output an indication of the adjustment to the at least one timeout value or the retrieval of the set of motion vectors.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
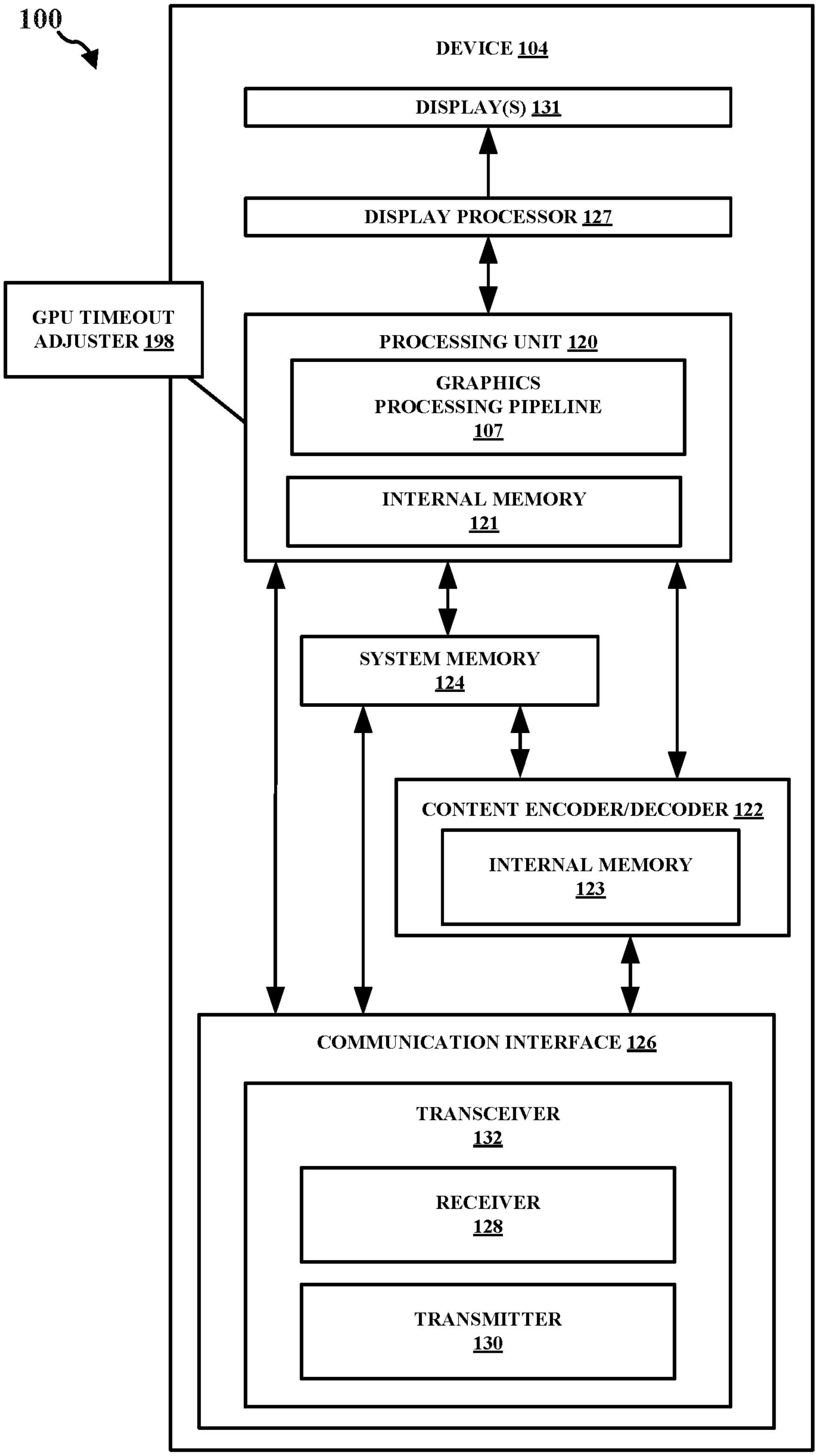
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

Augmented Reality (AR) may refer to a technology that blends aspects of a digital experience and the real world. A user may wear a headset (i.e., an AR headset) in order to experience AR content. In an example, the AR content may be based in part on a head pose (e.g., a position and an orientation) of a user. There may be a change in the head pose of a user between a time at which a frame of AR content is rendered and a time at which the frame is displayed to the user via the AR headset. To account for the change in the head pose, the AR headset may perform a late stage reprojection (LSR). LSR (which may also be referred to as a reprojection or a warp) may refer to a process of adjusting a frame based on previously rendered frame(s) and a latest available head pose of the user. The AR headset may perform an LSR for each color field (e.g., a red (R) color field, a green (G) color field, and a blue (B) color field) of a frame. With more particularity, the AR headset may perform an LSR for each color field of the frame using a set of motion vectors generated by a graphics processor, where a combination of the set of motion vectors and previously rendered frame(s) may be indicative of a head pose of the user.

An LSR may occur within a relatively short time frame (e.g., a fraction of a millisecond). Furthermore, generation of a set of motion vectors for an LSR may take time. In order to facilitate a frame of AR content being displayed in a timely manner, each color field of the frame may be configured with a timeout value. If an AR headset is not able to generate a set of motion vectors for a color field (e.g., an R color field) of a frame within a timeout value (e.g., due to heavy workloads of the AR headset), the AR headset may reuse a set of motion vectors for a previous frame in order to perform the LSR. However, reusing the set of motion vectors for the previous frame may cause an incoherent reprojection across all of the color fields for the frame, particularly when a head pose of a user changes by a relatively large amount between a render time and a display time. With more particularity, reusing the set of motion vectors for the previous frame may increase a motion to photon (M2P) latency, cause color separation issues in a frame, and/or may affect a user experience.

Various technologies pertaining to improving a user experience using dynamic graphics processor timeouts are described herein. In an example, an apparatus configures a set of graphics processor timeout values for a set of color fields for a first frame, where a sum of the set of graphics processor timeout values is less than or equal to a threshold graphics processor timeout value. As used herein, a graphics processor timeout value may refer to a value that corresponds to an amount of time that a graphics processor is allotted to generate a set of motion vectors for a color field of a frame, where the set of motion vectors may be used for a reprojection. As used herein, a color field may refer to a value of a pixel associated with a particular color in set of colors (e.g., red, green, and blue) in an image. A set of color fields may describe a color displayed on a display. The apparatus detects, based on the set of graphics processor timeout values, that a graphics processor timeout has occurred with respect to at least one color field in the set of color fields. As used herein, a graphics processor timeout may refer to an instance in which a graphics processor fails to generate a set of motion vectors for a color field within a period of time defined by a graphics processor timeout value. The apparatus performs, based on the detection and a head pose of a user, (1) an adjustment (i.e., an increase or decrease) to at least one timeout value in the set of graphics processor timeout values such that the sum of the set of graphics processor timeout values remains less than or equal to the threshold graphics processor timeout value or (2) a retrieval of a set of motion vectors for a second frame, where the second frame is prior to the first frame. As used herein, a head pose may refer to a position (e.g., an x-coordinate, a y-coordinate, and a z-coordinate) and an orientation (e.g., a roll, a pitch, and a yaw) of a head of a user. As used herein, a motion vector may refer to a vector that describes motion between frames. The apparatus outputs an indication of the adjustment to the at least one timeout value or the retrieval of the set of motion vectors. Vis-à-vis performing the adjustment or performing the retrieval of the set of motion vectors for the second frame based on the detection and the head pose of the user, the apparatus may reduce an M2P latency, reduce or eliminate color separation issues, and/or may improve a user experience.

There may be a specific reprojection timeout mechanism set for motion vector generation (MVGrid) by a graphics processing unit (GPU) in a video analytics engine module. In such a timeout, the video analytics engine module may pick up an old MVGrid of a previous field and not wait for the GPU to finish a current MVGrid. This may cause an incoherent reprojection across all of the color fields and impact a user experience via an increased M2P latency and color separation issues. In one aspect described herein, timeouts may be set dynamically for all 3 color fields such that a sum of timeouts for all 3 fields is less than 1.8 ms (0.6*3). Some devices may have a hard timeout (0.6 ms) set for the GPU to generate a MVGrid for each field. Aspects presented herein may increase a timeout incrementally from 0.6 ms as a step function with a step width of 0.05 ms. For example, if there are continuous timeouts for an R field, the timeout for R field may be increased to 0.65 ms as a first step, to 0.7 ms as a second step, etc. until there are no timeouts. This process may also be done in reverse: set to a maximum possible timeout directly and reduce via a step function to find a border where timeouts occur. In one aspect described herein, timeouts may not be increased when there is low head movement.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

A user may wear a display device in order to experienced extended reality (XR) content. XR may refer to a technology that blends aspects of a digital experience and the real world. Content associated with XR may be referred to as XR content. XR may include augmented reality (AR), mixed reality (MR), and/or virtual reality (VR). A device that is capable of presenting XR content may be referred to as an XR device. In AR, AR objects may be superimposed on a real-world environment as perceived through the display device. In an example, AR content may be experienced through AR glasses that include a transparent or semi-transparent surface. An AR object may be projected onto the transparent or semi-transparent surface of the glasses as a user views an environment through the glasses. In general, the AR object may not be present in the real world and the user may not interact with the AR object. Content associated with AR may be referred to as AR content. In MR, MR objects may be superimposed on a real-world environment as perceived through the display device and the user may interact with the MR objects. In some aspects, MR objects may include "video see through" with virtual content added. In an example, the user may "touch" a MR object being displayed to the user (i.e., the user may place a hand at a location in the real world where the MR object appears to be located from the perspective of the user), and the MR object may "move" based on the MR object being touched (i.e., a location of the MR object on a display may change). In general, MR content may be experienced through MR glasses (similar to AR glasses) worn by the user or through a head mounted display (HMD) worn by the user. The HMD may include a camera and one or more display panels. The HMD may capture an image of environment as perceived through the camera and display the image of the environment to the user with MR objects overlaid thereon. Unlike the transparent or semi-transparent surface of the AR/MR glasses, the one or more display panels of the HMD may not be transparent or semi-transparent. Content associated with MR may be referred to as MR content. In VR, a user may experience a fully-immersive digital environment in which the real-world is blocked out. VR content may be experienced through a HMD. Content associated with VR may be referred to as VR content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit may include a GPU timeout adjuster 198 configured to configure a set of graphics processor timeout values for a set of color fields for a first frame, where a sum of the set of graphics processor timeout values is less than or equal to a threshold graphics processor timeout value; detect, based on the set of graphics processor timeout values, that a graphics processor timeout has occurred with respect to at least one color field in the set of color fields; perform, based on the detection and a head pose of a user, (1) an adjustment to at least one timeout value in the set of graphics processor timeout values such that the sum of the set of graphics processor timeout values remains less than or equal to the threshold graphics processor timeout value or (2) a retrieval of a set of motion vectors for a second frame, where the second frame is prior to the first frame; and output an indication of the adjustment to the at least one timeout value or the retrieval of the set of motion vectors. Although the following description may be focused on graphics processing, the concepts described herein may be applicable to other similar processing techniques. Although the following description may be focused on wearable extended reality (XR) devices, the concepts presented herein may also be applicable to non-wearable XR devices. Additionally, although the following description may be focused on red green blue (RGB) color fields, the concepts presented herein may also be applicable to other types of color fields (e.g., hue saturation value (HSV) color fields).

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
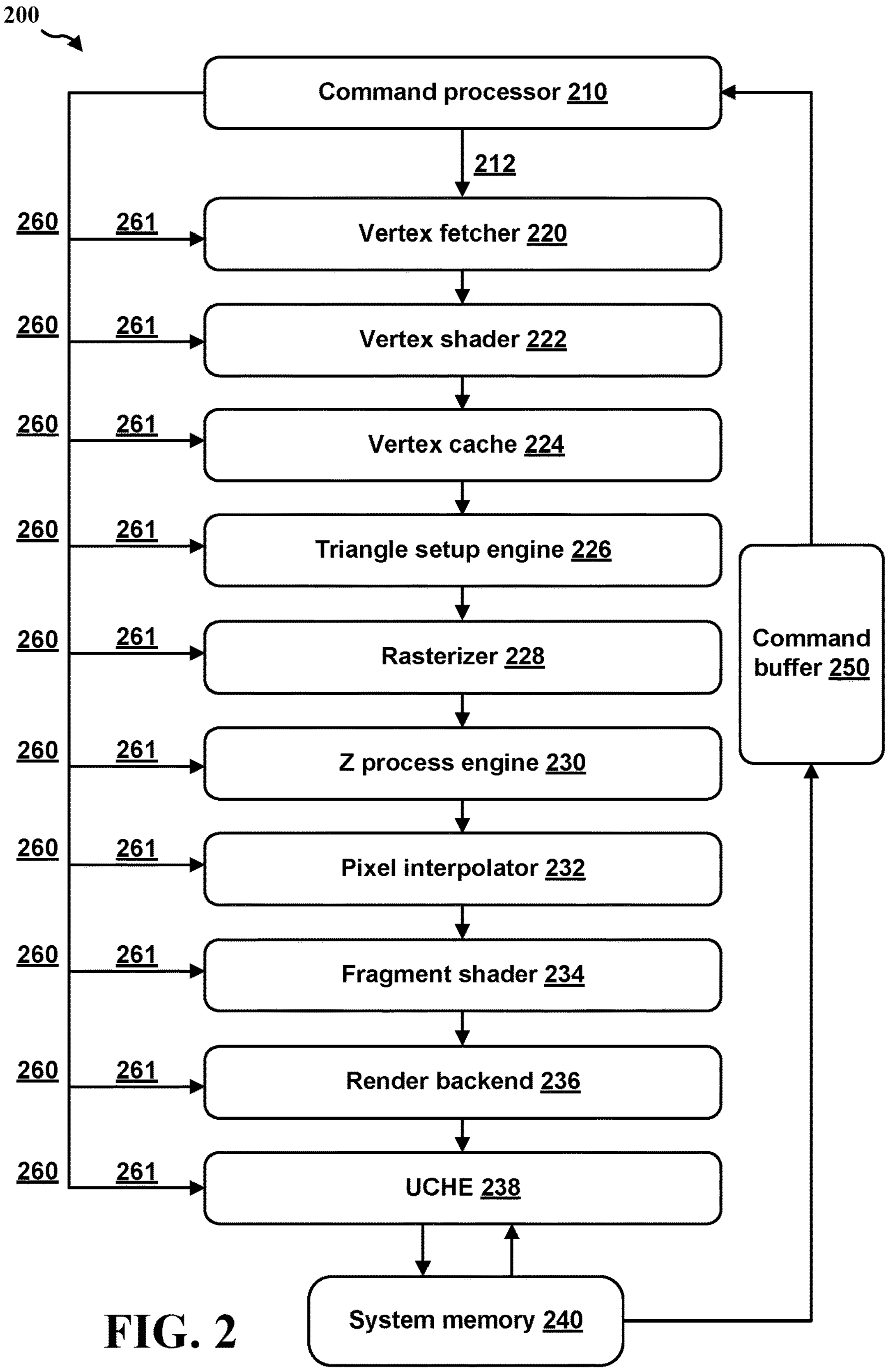
FIG. 2 illustrates an example graphics processor (e.g., a graphics processing unit (GPU)) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
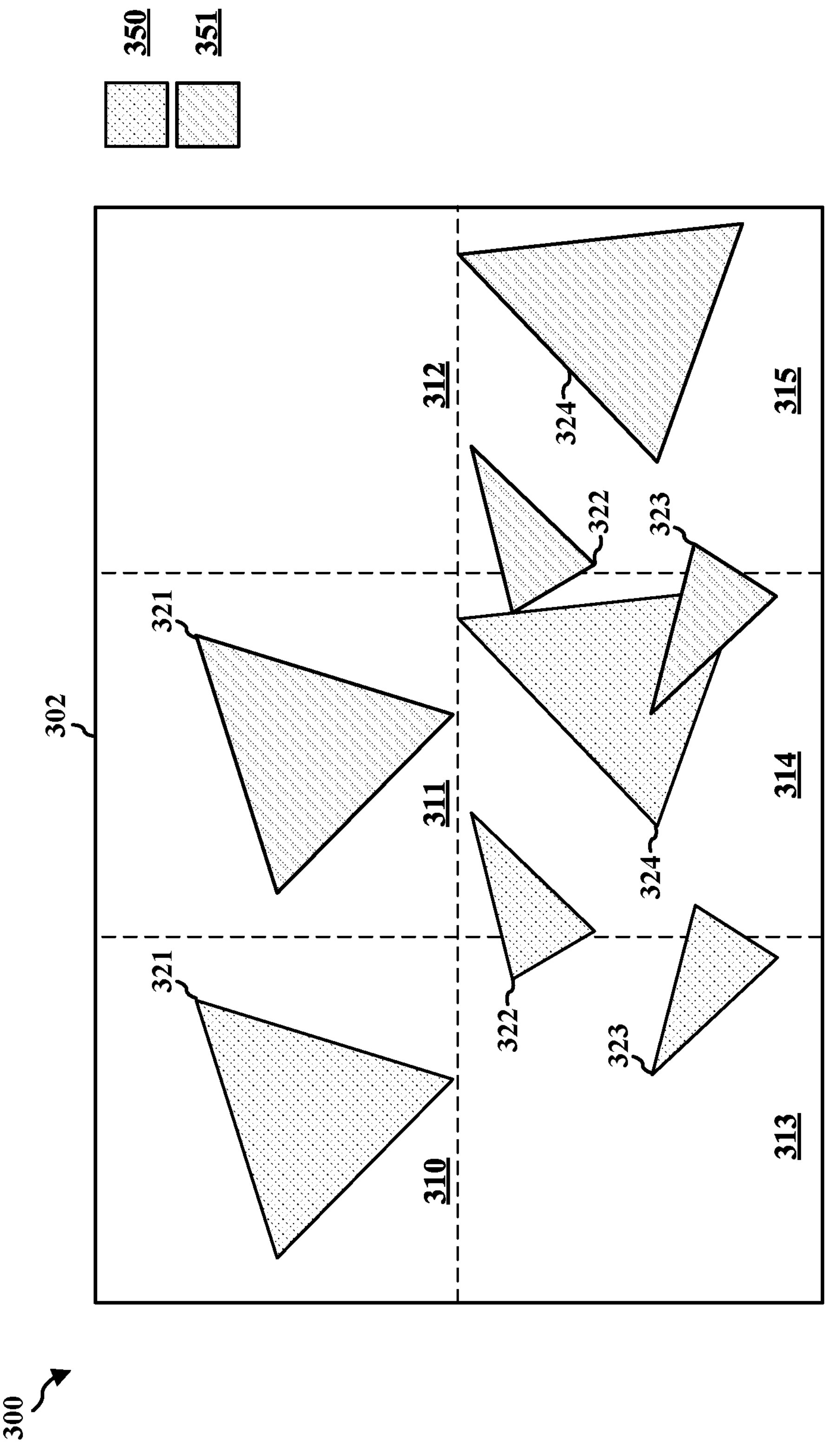
FIG. 3 illustrates an example image or surface in accordance with one or more techniques of this disclosure.

FIG. 3 illustrates image or surface 300, including multiple primitives divided into multiple bins in accordance with one or more techniques of this disclosure. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processors can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or consume more power compared to storing data at the frame buffer or system memory.

Figure 4:
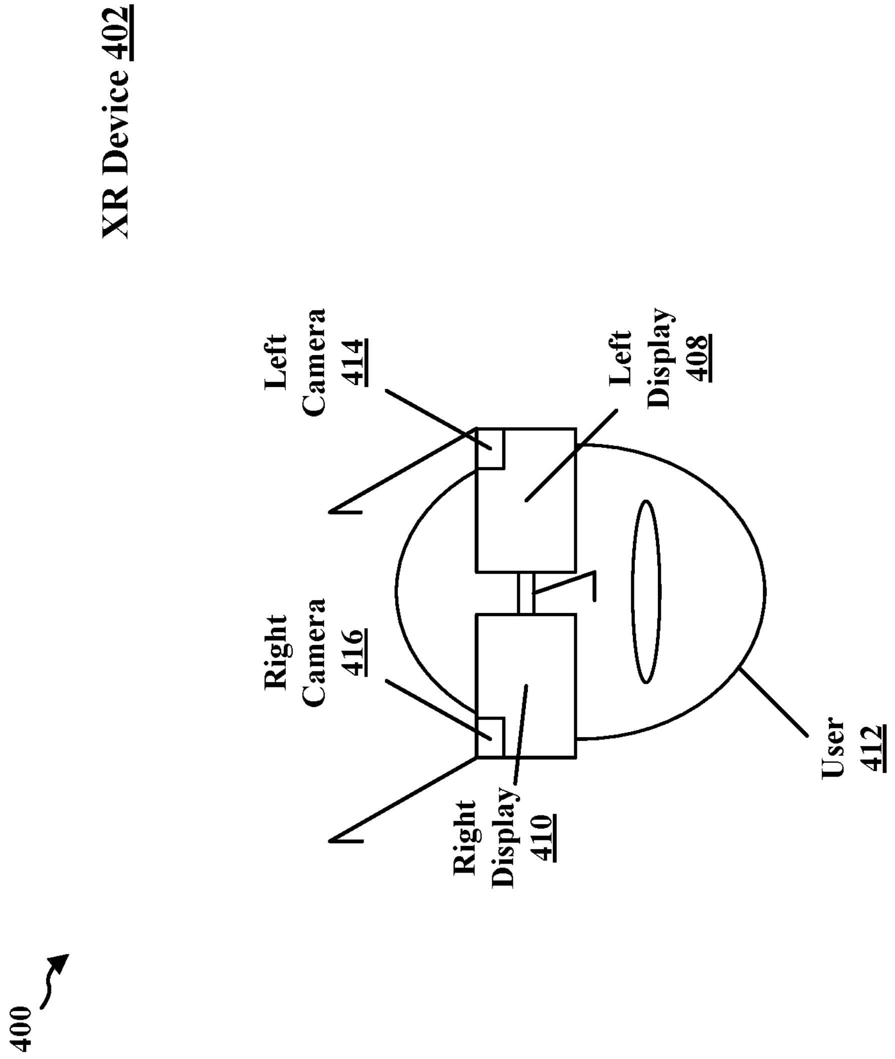
FIG. 4 is a diagram illustrating an example of extended reality (XR) device in accordance with one or more techniques of this disclosure.

FIG. 4 is a diagram 400 illustrating an example of an XR device 402 in accordance with one or more techniques of this disclosure. In an example, the XR device 402 may be or include the device 104. In an example, the XR device 402 may be or include an HMD (e.g., a headset) or XR glasses (e.g., AR glasses). In an example, the XR device 402 may include a left display 408 and a right display 410. In another example, the XR device 402 may include a single display (not depicted in FIG. 4) with a first region associated with a left eye of the user 412 and a second region associated with a right eye of the user 412. The XR device 402 may also include a left camera 414 and a right camera 416. The left camera 414 and the right camera 416 may be video cameras. The left camera 414 may be located at a first position and/or oriented at a first angle on the XR device 402 and the right camera 416 may be located at a second position and/or oriented at a second angle on the XR device 402, where the first position and the second position may be different, and where the first orientation and the second orientation may also be different. The left camera 414 may be associated with the left display 408 and the right camera 416 may be associated with the right display 410 (described in greater detail below).

The XR device 402 may be worn on/over/near a head of the user 412. For example, when the XR device 402 is worn by the user 412, the left display 408 and the right display 410 may be positioned within several centimeters from a left eye of the user 412 and a right eye of the user 412, respectively. In one example, the left display 408 and the right display 410 may be liquid crystal displays (LCDs), light emitting diode (LED) displays, etc. In such an example, the left camera 414 and the right camera 416 may capture a left image and a right image, respectively, of an environment of the user 412 as the user wears the XR device 402, where the left image and the right image may correspond to what the user 412 would perceive if the user 412 was not wearing the XR device 402. The XR device 402 may present the left image and the right image on the left display 408 and the right display 410, respectively. The XR device 402 may also present XR content on/in the left image and/or the right image, where the XR content is generated by the XR device 402 and where the XR content is not physically present in the environment of the user 412 (i.e., video see through). For instance, the XR content may be superimposed on the left image and/or the right image. In an example, the XR content may appear to be part of the environment of the user 412.

The XR device 402 may perform a reprojection (i.e., a reprojection process) as the user 412 views an environment through the XR device 402 (e.g., through the left display 408 and the right display 410). Reprojection may reduce a motion to photon (M2P) delay incurred due to pipeline propagation(s). Reprojection may be associated with updating a frame based on a latest head pose of the user 412 prior to display of frame(s) on the left display 408 and the right display 410 (i.e., prior to consumption of the frame(s)). Reprojection may entail a driver of the XR device 402 retrieving previously rendered frame(s) and using newer motion information (e.g., latest available pose information) from sensor(s) (e.g., an inertial measurement unit (IMU)) of the XR device 402 to extrapolate the previously rendered frame(s) into a prediction of how a "normal frame" (i.e., a frame rendered at display time) would appear. The extrapolation may also be referred to as "reprojection" or "warping."

A perception path (which may also be referred to as a six degrees of freedom (6DOF) path) may be responsible for pose estimation of the XR device 402. 6DOF may refer to six mechanical degrees of freedom of movement of a rigid body in three-dimensional space. 6DOF may include translation and orientation. The translation may include a forward/backward (surge) change in position, an up/down change in position (heave), and a left/right (sway) change in position. The orientation may include a yaw, a pitch, and a roll. The perception path may include an IMU. A graphics processor (e.g., a GPU) of the XR device 402 may be responsible for generating a motion vector (MV) grid (which may also be referred to as an MV map) based on pose information (i.e., 6DOF information) generated by the IMU. A computer vision module of the XR device 402 may be responsible for performing the reprojection.

The computer vision module may perform reprojection on each color field of each frame of XR content displayed by the XR device 402. In an example, a frame may include a red (R) color field, a green (G) color field, and a blue (B) color field. The computer vision module may perform a reprojection on each of the R color field, the G color field, and the B color field. In one aspect, an AR chipset may perform a reprojection on the frame.

Figure 5:
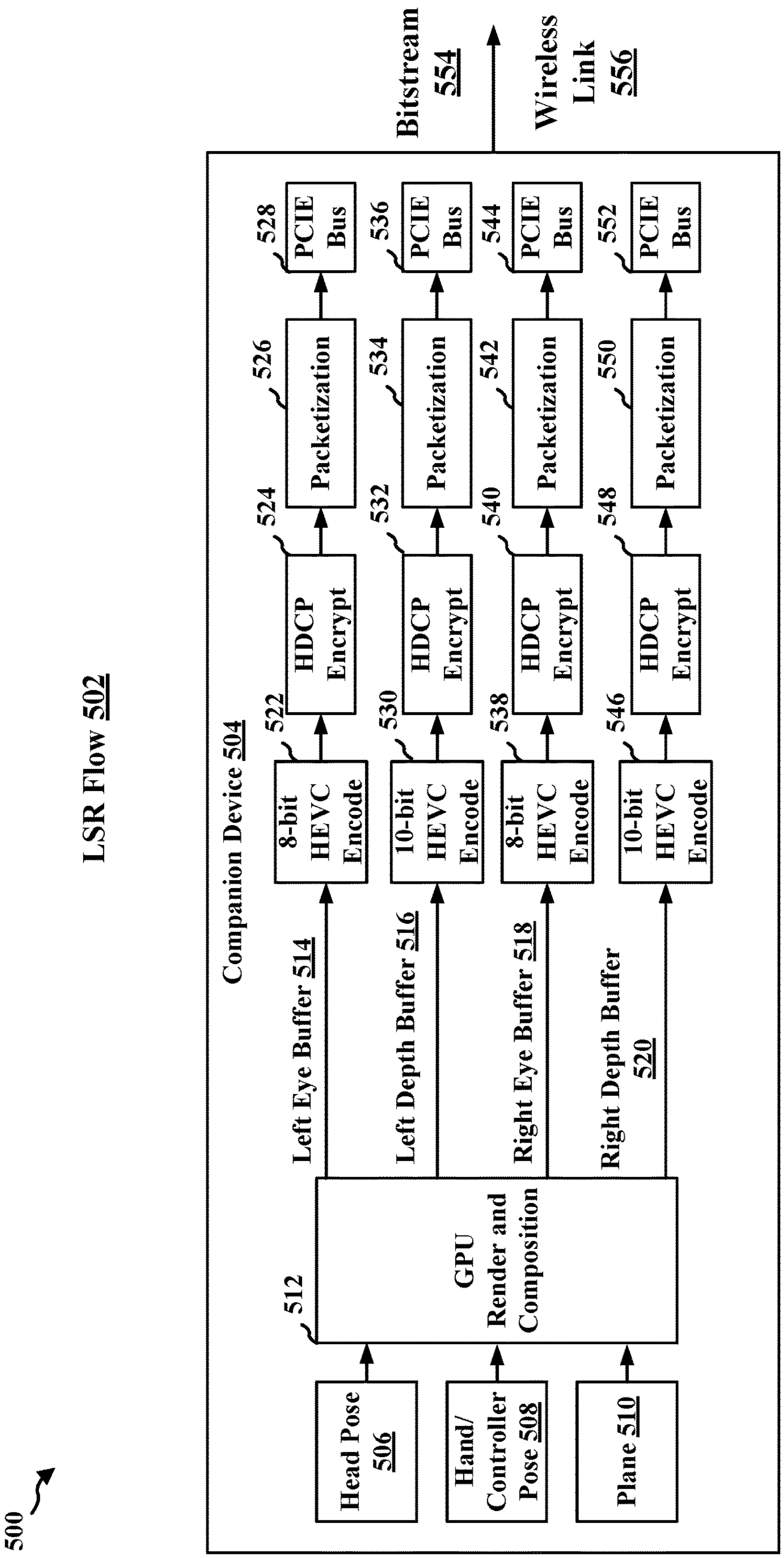
FIG. 5 is a diagram illustrating an example of a late stage reprojection (LSR) flow on a companion device in accordance with one or more techniques of this disclosure.

FIG. 5 is a diagram 500 illustrating an example of a late stage reprojection (LSR) flow 502 on a companion device 504 in accordance with one or more techniques of this disclosure. The companion device 504 may also be referred to as a puck or a remote device. In an example, the companion device 504 may be a phone, a desktop computing device, a laptop computing device, a tablet computing device, a gaming console, or a server (e.g., a cloud server). In an example, the companion device 504 may be the device 104. In an example, the companion device 504 may operate at 48 Hz.

The companion device 504 may obtain an indication of a head pose 506 of a user (e.g., the user 412), an indication of a hand/controller pose 508 of the user, and/or an indication of a plane 510. The indication of the head pose 506 may be a 6DOF head pose. The indication of the hand/controller pose 508 may be a 6DOF hand pose. The indication of the plane 510 may include layer(s) of frame(s).

At 512, a GPU may render and compose frame data (e.g., XR frame data) based on the indication of the head pose 506, the hand/controller pose 508, and/or the indication of the plane 510. The frame data may include a left eye buffer 514, a left depth buffer 516, a right eye buffer 518, and a right depth buffer 520. The left eye buffer 514 may be indicative of a left frame that is to be displayed on a left display (e.g., the left display 408). The left depth buffer 516 may be indicative of depth of content in the left frame. The right eye buffer 518 may be indicative of a right frame that is to be displayed on a right display (e.g., the right display 410). The right depth buffer 520 may be indicative of depth of content in the right frame.

At 522, the companion device 504 may encode the left eye buffer 514 via an 8-bit high efficiency video codec (HEVC). At 524, the companion device 504 may perform high-bandwidth digital content protection (HDCP) encryption on the (encrypted) left eye buffer 514. At 526, the companion device 504 may packetize the (encoded and encrypted) left eye buffer 514. At 528, the companion device 504 may provide the (packetized) left eye buffer 514 to a peripheral component interconnect express (PCIE) bus of the companion device 504.

At 530, the companion device 504 may encode the left depth buffer 516 via a 10-bit HEVC. At 532, the companion device 504 may perform HDCP encryption on the (encrypted) left depth buffer 516. At 534, the companion device 504 may packetize the (encoded and encrypted) left depth buffer 516. At 536, the companion device 504 may provide the (packetized) left depth buffer 516 to the PCIE bus of the companion device 504.

At 538, the companion device 504 may encode the right eye buffer 518 via an 8-bit HEVC. At 540, the companion device 504 may perform HDCP encryption on the (encrypted) right eye buffer 518. At 542, the companion device 504 may packetize the (encoded and encrypted) right eye buffer 518. At 544, the companion device 504 may provide the (packetized) right eye buffer 518 to the PCIE bus of the companion device 504.

At 546, the companion device 504 may encode the right depth buffer 520 via a 10-bit HEVC. At 548, the companion device 504 may perform HDCP encryption on the (encrypted) right depth buffer 520. At 550, the companion device 504 may packetize the (encoded and encrypted) right depth buffer 520. At 552, the companion device 504 may provide the (packetized) right depth buffer 520 to the PCIE bus of the companion device 504.

The PCIE bus may cause a bitstream 554 to be generated, where the bitstream 554 may include the (encoded, encrypted, and packetized) left eye buffer 514, the (encoded, encrypted, and packetized) left depth buffer 516, the (encoded, encrypted, and packetized) right eye buffer 518, and the (encoded, encrypted, and packetized) right depth buffer 520. The companion device 504 may transmit the bitstream 554 over a wireless link 556. In an example, the wireless link 556 may be or include a wireless local area network (WLAN) link, a Bluetooth™(Bluetooth is a trademark of the Bluetooth Special Interest Group (SIG)) link, a cellular link (e.g., 5G New Radio NR) etc. In an example, the wireless link 556 may be a Wi-Fi™(Wi-Fi is a trademark of the Wi-Fi Alliance) link that is based on the Institute of Electrical and Electronics Engineers (IEEE) 802.11 standard, such as the IEEE 802.11ax standard. Alternatively, the bitstream 554 may be transmitted over a wired link.

Figure 6:
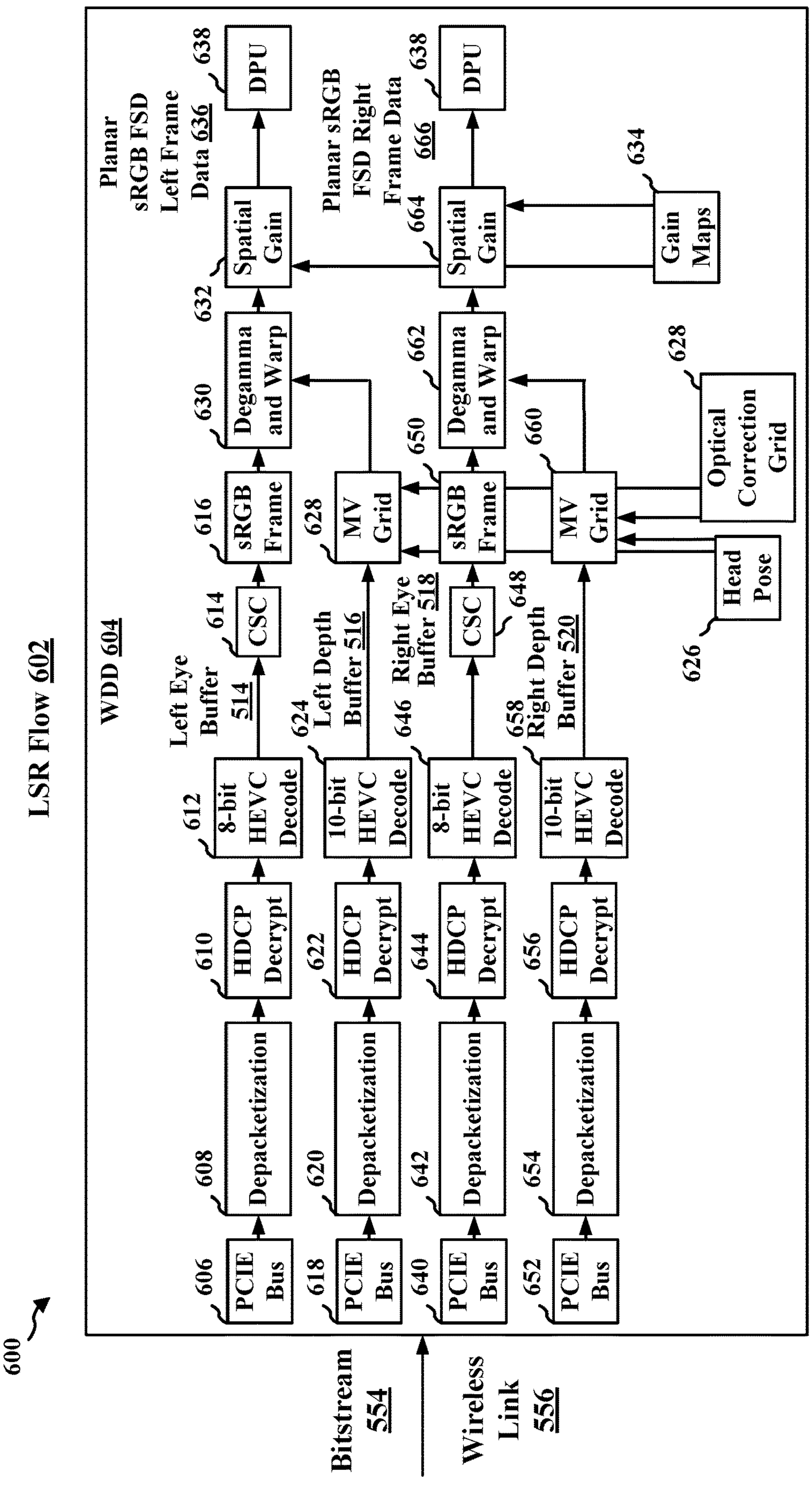
FIG. 6 is a diagram illustrating an example of an LSR flow on a wearable display device (WDD) in accordance with one or more techniques of this disclosure.

FIG. 6 is a diagram 600 illustrating an example of an LSR flow 602 on a wearable display device (WDD) 604 in accordance with one or more techniques of this disclosure. As used herein, a wearable display device may refer to a device worn on/over/around a head of a user that presents visual and/or audio content to a user. In an example, the WDD 604 may be the device 104 or the XR device 402. A user (e.g., the user 412) may wear the WDD 604 on/over/around eyes of the user. The companion device 504 and the WDD 604 may be configured in a split rendering configuration in which some rendering tasks for XR content are performed by the companion device 504 and other rendering tasks for the XR content are performed by the WDD 604. In an example, the companion device 504 may have relatively greater computational capabilities compared to computational capabilities of the WDD 604. For instance, the companion device 504 may include a first processor and the WDD 604 may include a second processor, where the first processor may have a faster clock speed than the second processor, and/or where the first processor may have a greater number of processing cores compared to a number of processing cores of the second processor. In another example, the companion device 504 may include a first amount of memory and the WDD 604 may include a second amount of memory, where the first amount of memory is greater than the second amount of memory. The WDD 604 may have smaller dimensions and/or a reduced weight compared to dimensions and/or a weight of the companion device 504; however, the WDD 604 may have less battery life compared to a battery life of the companion device 504. In an example, the WDD 604 may operate at 360 Hz or 480 Hz.

The WDD 604 may obtain (e.g., receive) the bitstream 554 that was transmitted over the wireless link 556 by the companion device 504. At 606, a PCIE bus of the WDD 604 may obtain the (encoded, encrypted, and packetized) left eye buffer 514 from the bitstream 554. At 608, the WDD 604 may depacketize the (encoded, encrypted, and packetized) left eye buffer 514. At 610, the WDD 604 may perform HDCP decryption on the (encoded and encrypted) left eye buffer 514. At 612, the WDD 604 may perform 8-bit HEVC decoding on the (encoded) left eye buffer 514 to obtain the left eye buffer 514. At 614, the WDD 604, via a visual analytics engine, may perform a color space conversion (CSC) on the left eye buffer 514. For instance, prior to the CSC, the left eye buffer 514 may be in a luma (Y) chroma (UV) (YUV) format (e.g., the UV component in the YUV format may include a blue projection and a red projection). The visual analytics engine may be implemented in hardware. The visual analytics engine may also be referred to as a computer vision engine. The CSC may convert the left eye buffer 514 from the YUV format to an RGB format, that is, the CSC may produce a standard RGB (sRGB) frame 616 corresponding to the left eye buffer 514.

The WDD 604 may obtain (e.g., receive) the bitstream 554 that was transmitted over the wireless link 556 by the companion device 504. At 618, a PCIE bus of the WDD 604 may obtain the (encoded, encrypted, and packetized) left depth buffer 516 from the bitstream 554. At 620, the WDD 604 may depacketize the (encoded, encrypted, and packetized) left depth buffer 516. At 622, the WDD 604 may perform HDCP decryption on the (encoded and encrypted) left depth buffer 516. At 624, the WDD 604 may perform 10-bit HEVC decoding on the (encoded) left depth buffer 516 to obtain the left depth buffer 516.

The WDD 604 may obtain a head pose 626 of a user of the WDD 604, where the head pose 626 may be a latest head pose of the user. The WDD 604, via a GPU, may generate a motion vector (MV) grid based on the head pose 626, an optical correction grid 628, and the left depth buffer 516. The optical correction grid 628 may include data used for removing optical aberrations as perceived through glass of a display (e.g., the left display 408). The MV grid may include a set of motion vectors that describe motion (e.g., a predicted motion) of a head of the user. At 630, the WDD 604, via the visual analytics engine, may perform a degamma and warping operation (e.g., a reprojection) based on the MV grid and the sRGB frame 616. At 632, the WDD 604 may perform, via the visual analytics engine, a spatial gain operation (referred to in FIG. 6 as "Spatial Gain") based on gain maps 634 in order to adjust a brightness of the (warped) sRGB frame 616. The spatial gain operation may generate planar sRGB field sequential display (FSD) left frame data 636. The WDD may provide the planar sRGB FSD left frame data 636 to a DPU 638. The DPU 638 may cause a left frame to be presented on a left display based on the planar sRGB FSD left frame data 636.

At 640, the PCIE bus of the WDD 604 may obtain the (encoded, encrypted, and packetized) right eye buffer 518 from the bitstream 554. At 642, the WDD 604 may depacketize the (encoded, encrypted, and packetized) right eye buffer 518. At 644, the WDD 604 may perform HDCP decryption on the (encoded and encrypted) right eye buffer 518. At 646, the WDD 604 may perform 8-bit HEVC decoding on the (encoded) right eye buffer 518 to obtain the right eye buffer 518. At 648, the WDD 604, via the visual analytics engine, may perform a CSC on the right eye buffer 518. For instance, prior to the CSC, the right eye buffer 518 may be in YUV format. The CSC may convert the right eye buffer 518 from the YUV format to an RGB format, that is, the CSC may produce an sRGB frame 650 corresponding to the right eye buffer 518.

The WDD 604 may obtain (e.g., receive) the bitstream 554 that was transmitted over the wireless link 556 by the companion device 504. At 652, a PCIE bus of the WDD 604 may obtain the (encoded, encrypted, and packetized) right depth buffer 520 from the bitstream 554. At 654, the WDD 604 may depacketize the (encoded, encrypted, and packetized) right depth buffer 520. At 656, the WDD 604 may perform HDCP decryption on the (encoded and encrypted) right depth buffer 520. At 658, the WDD 604 may perform 10-bit HEVC decoding on the (encoded) right depth buffer 520 to obtain the right depth buffer 520.

The WDD 604 may obtain the head pose 626 of a user of the WDD 604. At 660, the WDD 604, via the GPU, may generate an MV grid based on the head pose 626, the optical correction grid 628, and the right depth buffer 520. The MV grid may include a set of motion vectors that describe motion (e.g., a predicted motion) of a head of the user. At 662, the WDD 604, via the visual analytics engine, may perform a degamma and warping operation (e.g., a reprojection) based on the MV grid and the sRGB frame 650. At 664, the WDD 604 may perform, via the visual analytics engine, a spatial gain operation (referred to in FIG. 6 as "Spatial Gain") based on the gain maps 634 in order to adjust a brightness of the (warped) sRGB frame 650. The spatial gain operation may generate planar sRGB FSD right frame data 666. The WDD may provide the planar sRGB FSD right frame data 666 to the DPU 638 (or another DPU). The DPU 638 (or another DPU) may cause a right frame to be presented on a right display based on the planar sRGB FSD right frame data 666.

Reprojection and pose estimation processes may occur at fractional millisecond time scales. A device (e.g., the WDD 604, the XR device 402) may be configured with timeout values for color fields of a frame to facilitate the display of graphical data for a user when the device encounters computational bottlenecks (e.g., computational slowdowns). For example, a frame may include/be associated with a set of color fields, where the set of color fields may include an R color field, a G color field, and a B color field. In the example, the timeout values may include a first timeout value corresponding to the R color field, a second timeout value corresponding to the G color field, and a third timeout value corresponding to the B color field. If a set of motion vectors (i.e., a motion vector grid) for a particular color field (e.g., the R color field) are not generated within a time period associated with a particular timeout value (e.g., the first timeout value), the device may reuse a prior set of motion vectors from a prior frame for warping purposes instead of waiting for a GPU of the device to finish generating a current motion vector grid. Stated differently, there may be a timeout mechanism set for motion vector generation by a GPU in a visual analytics engine (e.g., a visual analytics engine module) of the device. When the timeout mechanism is activated, a visual analytics engine may retrieve a prior MV grid for a color field and use the prior MV grid for reprojection purposes instead of waiting for the generation of a current MV grid. In an example, if the first timeout value is exceeded for the R color field, a visual analytics engine may retrieve a prior MV grid for the R color field for a previous frame and the visual analytics engine may perform a reprojection based on the prior MV grid for the R color field instead of waiting for the GPU to generate a current MV Grid for the R color field.

In an example, the GPU of the device may be under heavy computational workloads. In the example, many timeouts may occur for one or multiple color fields for many frames. For example, many timeouts may occur with respect to R color fields for many frames. As such, the device may repeatedly use prior MV grids for the R color fields for reprojection purposes. This may cause an incoherent reprojection to occur across all color fields. The incoherent reprojection may cause color separation issues (e.g., color bleeding). Color bleeding may refer to a phenomenon in which objects are colored by reflection of colored light from nearby surfaces. Furthermore, reusing prior MV grids may result in an increased M2P latency (e.g., due to a visual analytics engine using previous MV grid(s) instead of current MV grid(s)), which may affect a user experience.

Figure 7:
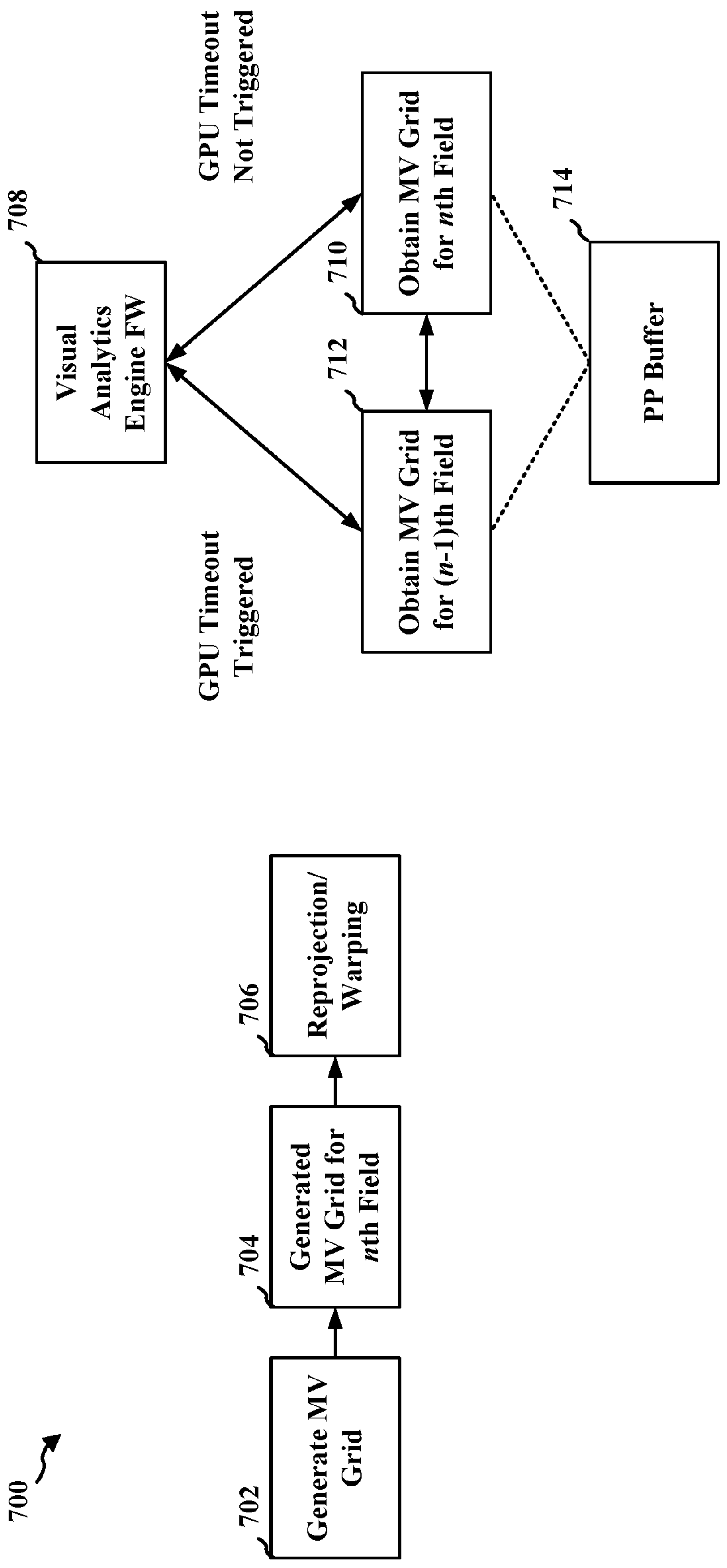
FIG. 7 is a diagram illustrating example aspects pertaining to motion vector (MV) grids and LSR in accordance with one or more techniques of this disclosure.

FIG. 7 is a diagram 700 illustrating example aspects pertaining to motion vector (MV) grids and LSR in accordance with one or more techniques of this disclosure. At 702, a GPU of a device (e.g., the device 104, the XR device 402, the WDD 604) may generate an MV grid. For instance, at 704, the GPU may generate an MV grid for an nth field, where n is an integer. At 706, visual analytics engine firmware (FW) may perform a reprojection/warp.

As described above, a color field may be configured with a timeout value (e.g., a GPU timeout value). In an example, visual analytics engine FW 708 may detect whether a GPU timeout has been triggered with respect to a color field of a frame. At 710, if the GPU timeout has not been triggered, the visual analytics engine FW 708 may obtain an MV grid for the nth color field. At 712, if the GPU timeout has been triggered, the visual analytics engine FW 708 may obtain an MV grid for an (n−1)th color field, where the MV grid for an (n−1)th color field may be from a prior frame. In an example, the MV grid for the nth color field and the MV grid for the (n−1)th color field may be generated, retrieved, and/or stored in a ping pong (PP) buffer 714.

Figure 8:
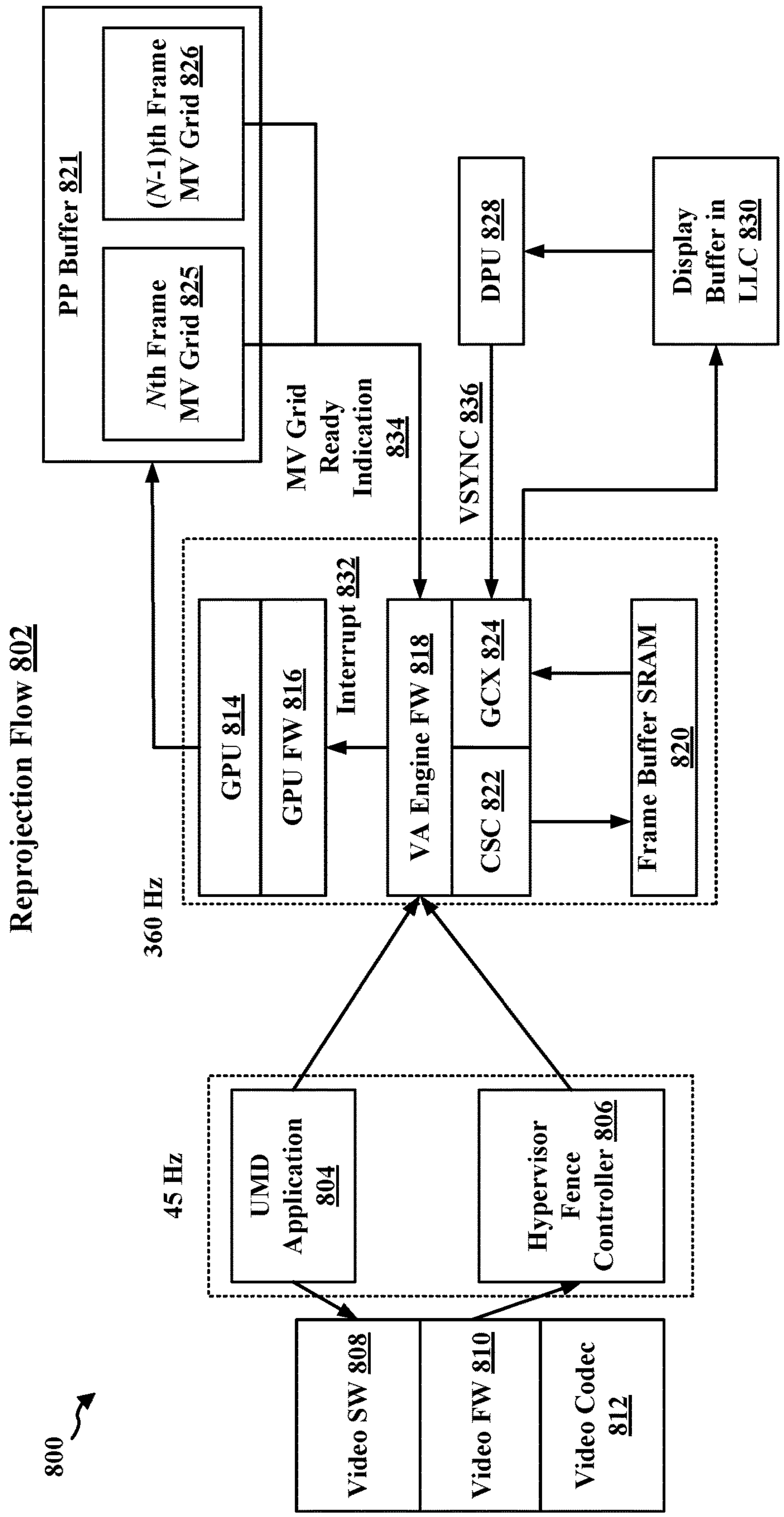
FIG. 8 is a diagram illustrating an example reprojection flow in accordance with one or more techniques of this disclosure.

FIG. 8 is a diagram 800 illustrating an example reprojection flow 802 in accordance with one or more techniques of this disclosure. The reprojection flow 802 may be associated with the companion device 504 and the WDD 604. The reprojection flow 802 may also be referred to as a warping flow or an LSR flow.

The companion device 504 may include a user mode driver (UMD) application 804 and a hypervisor fence controller 806 that each operate at 45 Hz. The UMD application 804 may be configured to share buffers between video software (SW) 808 and visual analytics (VA) engine FW 818. The hypervisor fence controller 806 may be configured to notify the VA engine FW 818 once video firmware (FW) 810 has completed processing of a frame. The companion device 504 may also include the video SW 808, the video FW 810, and a video codec 812. In an example, the video codec 812 may be an HEVC codec (e.g., an 8-bit HEVC codec, a 10-bit HEVC codec, etc.). The companion device 504 may utilize the video SW 808, the video FW 810, and/or the video codec 812 to generate the bitstream 554. The UMD application 804 and/or the hypervisor fence controller 806 may coordinate to transmit the bitstream 554 to the WDD 604.

The WDD 604 may include a GPU 814, GPU FW 816, the VA engine FW 818, and frame buffer SRAM 820. In an example, the VA engine FW 818 may be or include the visual analytics engine FW 708. The VA engine FW 818 may be configured to perform a CSC 822 and a geometry correction (GCX) 824. The GCX 824 may refer to warping a frame based on a motion vector grid. In an example, the CSC 822 may be or include the CSC performed at 614 and 648 in FIG. 6. The frame buffer SRAM 820 may be configured to store a frame. For example, the frame buffer SRAM 820 may be configured to store the sRGB frame 616, the sRGB frame 650, the left eye buffer 514, the left depth buffer 516, the right eye buffer 518, the right depth buffer 520, the planar sRGB FSD left frame data 636, and/or the planar sRGB FSD right frame data 666. The GPU 814, the GPU FW 816, the VA engine FW 818, the CSC 822, the GCX 824, and the frame buffer SRAM 820 may be configured to operate at 360 Hz.

The WDD 604 may include a PP buffer 821. The PP buffer 821 may be or include the PP buffer 714. The PP buffer 821 may store an Nth frame MV grid 825 (which may also be referred to as "an Nth MV grid for the Nth frame") and an (N−1)th frame MV grid 826 (which may also be referred to as "an (N−1)th MV grid for the (N−1)th frame"), where N is an integer. The WDD 604 may also include a DPU 828 and a display buffer 830 (in a last level cache (LLC)). In an example, the DPU 828 may be or include the display processor 127. The display buffer 830 may be configured to store the planar sRGB FSD left frame data 636 and/or the planar sRGB FSD right frame data 666.

In an example, the VA engine FW 818 may obtain an eye buffer (e.g., the left eye buffer 514, the right eye buffer 518) and a depth buffer (e.g., the left depth buffer 516, the right depth buffer 520). For instance, the VA engine FW 818 may obtain a packetized, encrypted, and encoded eye buffer and a packetized, encrypted, and encoded depth buffer. The VA engine FW 818 may depacketize, decrypt, and decode the packetized, encrypted, and encoded eye buffer and the VA engine FW 818 may depacketize, decrypt, and decode the packetized, encrypted, and encoded depth buffer. The VA engine FW 818 may perform the CSC 822 on the depth buffer. The VA engine FW 818 may store the eye buffer in the frame buffer SRAM 820.

In an example, the VA engine FW 818 may generate an interrupt 832 and transmit the interrupt to the GPU 814. Upon receiving the interrupt 832, the GPU 814 (e.g., the GPU FW 816) may begin to generate the Nth frame MV grid 825 based on the depth buffer. The Nth frame MV grid 825 may be for a particular color field (e.g., an R color field). The GPU 814 (e.g., the GPU FW 816) may additionally begin to generate the Nth frame MV grid 825 based on a head pose and an optical correction grid. When the GPU 814 (e.g., the GPU FW 816) completes generation of the Nth frame MV grid 825, the PP buffer 821 may cause an MV grid ready indication 834 to be transmitted to the VA engine FW 818. Upon receiving the MV grid ready indication 834, the VA engine FW 818 may perform a reprojection (e.g., via the GCX 824) on the eye buffer stored in the frame buffer SRAM 820 based on the Nth frame MV grid 825. The VA engine FW 818 may cause the reprojected eye buffer to be stored in the display buffer 830. The DPU 828 may cause a vertical synchronization (VSYNC 836) to be performed.

Figure 9:
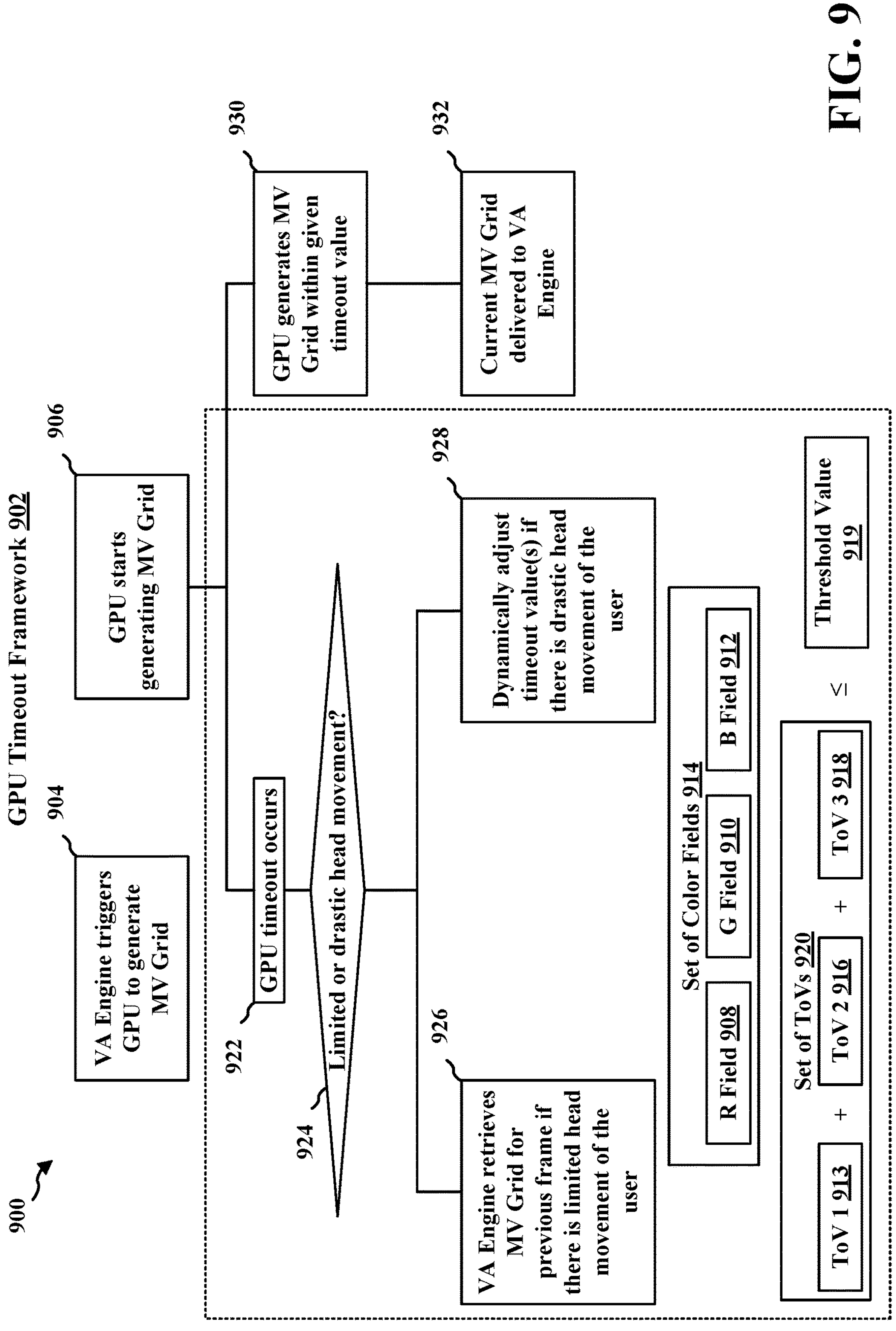
FIG. 9 is a diagram illustrating an example of a GPU timeout framework in accordance with one or more techniques of this disclosure.

FIG. 9 is a diagram 900 illustrating an example of a GPU timeout framework 902 in accordance with one or more techniques of this disclosure. In an example, the GPU timeout framework 902 may be implemented by the device 104, the XR device 402, and/or the WDD 604.

At 904, a visual analytics engine may trigger a GPU (e.g., the GPU 200) to generate an MV grid for a color field. At 906, the GPU may begin generating the MV grid for the color field based on the trigger. In an example, the visual analytics engine may transmit an indication to the GPU, where the indication may indicate that the GPU is to begin to generate the MV grid for the color field. The color field may be an R field 908, a G field 910, or a B field 912. The R field 908, the G field 910, and the B field 912 may be collectively referred to as a set of color fields 914. In an example, the R field 908, the G field 910, and the B field 912 may be associated with a first timeout value (ToV) 913, a second ToV 916, and a third ToV 918, respectively. The first ToV 913, the second ToV 916, and the third ToV 918 may be collectively referred to as a set of ToVs 920. The GPU may begin generating the MV grid for the color field based on the indication. The visual analytics engine may also configure the set of ToVs 920 prior to or concurrently with transmitting the indication. In an example, a sum of each of the set of ToVs 920 may be less than or equal to a threshold value 919. In an example, the threshold value 919 may be 1.8 ms and the first ToV 913, the second ToV 916, and the third ToV 918 may each be 0.6 ms (0.6*3). The threshold value 919 may be configured such that display frame rates are not drastically affected. In some devices, the first ToV 913, the second ToV 916, and the third ToV 918 may be fixed values. Aspects presented herein pertain to dynamically setting and adjusting each of the set of ToVs 920 in order to improve a user experience.

At 922, the visual analytics engine may detect that a GPU timeout has occurred with respect to the color field. With more particularity, when the visual analytics engine triggers the generation of the MV grid for the color field, the visual analytics engine may also trigger a timer to start running. The visual analytics engine may detect that the GPU timeout has occurred when the timer equals or exceeds a ToV for the color field and when a motion vector grid (or an indication thereof) has not been received by the visual analytics engine by the time the timer equals or exceeds the ToV. In an example, if the color field is the R field 908, and the timer equals or exceeds the first ToV 913 and a motion vector grid (or an indication thereof) for the R field 908 has not been received, the visual analytics engine may detect that a GPU timeout has occurred with respect to the R field 908.

Upon detecting that the GPU timeout has occurred, at 924, the visual analytics engine may determine whether there is limited movement or drastic movement of a head of the user. With more particularity, upon the detection, the visual analytics engine may obtain/compute a current head pose of the user and the visual analytics engine may obtain a prior head pose of the user. The visual analytics engine may compare the current head pose to the prior head pose in order to determine whether there is limited movement or drastic movement of the head of the user. In an example, the visual analytics engine may compute a difference between the current head pose and the prior head pose. If the difference is less than or equal to a threshold difference, the visual analytics engine may determine that there is limited movement of the head of the user. If the difference is greater than the threshold difference, the visual analytics engine may determine that there is drastic movement of the head of the user.

Upon detecting limited head movement, at 926, the visual analytics engine may retrieve a MV grid for a previous frame (i.e., "a prior MV grid") and perform a reprojection for the color field using the prior MV grid. In an example, the GPU timeout may occur with respect to an R color field of a frame, whereas no GPU timeout may occur with respect to a G color field of the frame and a B color field of the frame. In a first aspect, the visual analytics engine may retrieve a MV grid for an R color field of the previous frame. The visual analytics engine may reproject the R color field using the MV grid for the R color field of the previous frame, the visual analytics engine may reproject the G color field using a first MV grid for the current frame, and the visual analytics engine may reproject the B color field using a second MV grid for the current frame. In a second aspect, the visual analytics engine may retrieve a first MV grid for an R color field of the previous frame, a second MV grid for a G color field of the previous frame, and a third MV grid for a B color field of the previous frame. In the second aspect, the visual analytics engine may reproject an R color field, a G color field, and a B color field of a current frame using the first MV grid, the second MV grid, and the third MV grid, respectively. The second aspect may reduce color bleeding, but may impact perception. However, the impact on perception may be minimal if movement of the head of the user is minimal.

In one aspect, the visual analytics engine may compute the difference between the current head pose (i.e., a display pose) and the prior head pose (i.e., a render pose) as described above. The visual analytics engine may compare the difference to a second threshold, where the second threshold is less than the threshold described above. If the difference is less than the second threshold, the visual analytics engine may transmit an indication to the GPU that indicates that the GPU is not to generate MV grids for the current frame. The visual analytics engine may perform reprojection on color fields using MV grids from the previous frame. Stated differently, the visual analytics engine may prevent generation of MV grids if there is a minimal amount of difference between a render pose and a display pose. Such an aspect may conserve computing resources of the GPU.

In one aspect, the visual analytics engine (e.g., a visual analytics engine module) may query a neural signal processor (NSP) in order to determine whether limited head movement or drastic head movement has occurred. The NSP may determine whether limited head movement or drastic head movement has occurred based on the query. The NSP may provide an indication of limited head movement or drastic head movement to the visual analytics engine. Based on the indication, the visual analytics engine may determine whether or not to send an interrupt (e.g., the interrupt 832) to the GPU to generate an MV grid. In an example, if head movement is limited, the visual analytics engine may determine not to signal an interrupt to the GPU to generate a current MV grid. Such an aspect may conserve bandwidth associated with the GPU.

Upon detecting drastic head movement, at 928, the visual analytics engine may dynamically adjust timeout value(s) for color field(s). For example, the visual analytics engine may adjust the first ToV 913, the second ToV 916, and/or the third ToV 918 based on detecting the drastic head movement under a constraint that a sum of the (adjusted) set of ToVs 920 is less than or equal to the threshold value 919. In one example, the visual analytics engine may increase one or more of the first ToV 913, the second ToV 916, and/or the third ToV 918 such that a sum of the (adjusted) set of ToVs 920 is less than or equal to the threshold value 919. In another example, the visual analytics engine may increase a first subset of the set of ToVs 920 and decrease a second subset of the set of ToVs 920 such that a sum of the (adjusted) set of ToVs 920 is less than or equal to the threshold value 919. Adjusting the set of ToVs 920 in such a manner may provide the GPU with more time to generate MV grid(s) and hence may reduce or eliminate GPU timeouts with respect to color fields. As such, adjusting the timeout value(s) may eliminate or reduce quality related issues in frames, such as color bleeding/separation. In an example, adjusting the set of ToVs 920 may provide the GPU with sufficient time to generate an MV grid for a color field. The visual analytics engine may obtain the generated MV grid from the GPU and the visual analytics engine may reproject the color field using the generated MV grid. In one aspect, the first ToV 913, the second ToV 916, and/or the third ToV 918 may not be increased beyond an upper limit (e.g., 1 ms).

In one aspect, the visual analytics engine may dynamically adjust timeout value(s) incrementally via a step function. In an example, the step function may have a step width of 0.05 ms. In an example, the first ToV 913 for the R field 908 may initially be 0.6 ms. As a first step, the visual analytics engine may increase the first ToV 913 from 0.6 ms to 0.65 ms. The visual analytics engine may then determine whether GPU timeouts are still observed with respect to the R field 908. If GPU timeouts are still observed, the visual analytics engine may increase the first ToV 913 from 0.65 ms to 0.7 ms. The visual analytics engine may repeat this process until (1) GPU timeouts are no longer observed or (2) an upper limit (e.g., 1 ms) is reached. If GPU timeouts are no longer observed, the visual analytics engine may leave the first ToV 913 at the particular ToV.

If the upper limit is reached, the visual analytics engine may transmit an indication (i.e., an error signal) to an application associated with the frame (e.g., a video game application, a video playback application, etc.), where the indication may indicate that the GPU is under load and/or that a delay in a graphics/display related pipeline may be expected. The application may then adjust behavior of the application based on the indication. For example, the application may decrease a quality of rendered content, decrease a frame rate of the rendered content, etc. In a specific example, the application may increase a frame rate while decreasing a quality of rendered content. In one aspect, if the upper limit is reached and GPU timeouts are still observed, the visual analytics engine may determine whether to use a prior MV grid for a color field based on a comparison of a render pose to a display pose.

In one aspect, the visual analytics engine may implement a "top to bottom" approach in which the visual analytics engine may initially set a timeout value for a color field to the upper limit (e.g., 1.0 ms). The visual analytics engine may decrement the timeout value based on the step function and observe whether or not GPU timeouts occur (i.e., in order to find a border where timeouts occur). For instance, the visual analytics engine may decrement the timeout value from 1.0 ms to 0.95 ms. If a GPU timeout is observed at the 0.95 ms timeout value, the visual analytics engine may use the 1.0 ms timeout value. If a GPU timeout is not observed at the 0.95 ms timeout value, the visual analytics engine may decrement the timeout value to 0.9. The decrementation may continue until a GPU timeout is observed.

At 930, if no GPU timeout occurs, the GPU may generate a MV grid for a color field within a given timeout value. At 932, the GPU may deliver the MV grid to the visual analytics engine, whereupon the visual analytics engine may perform a reprojection based on the MV grid.

Figure 10:
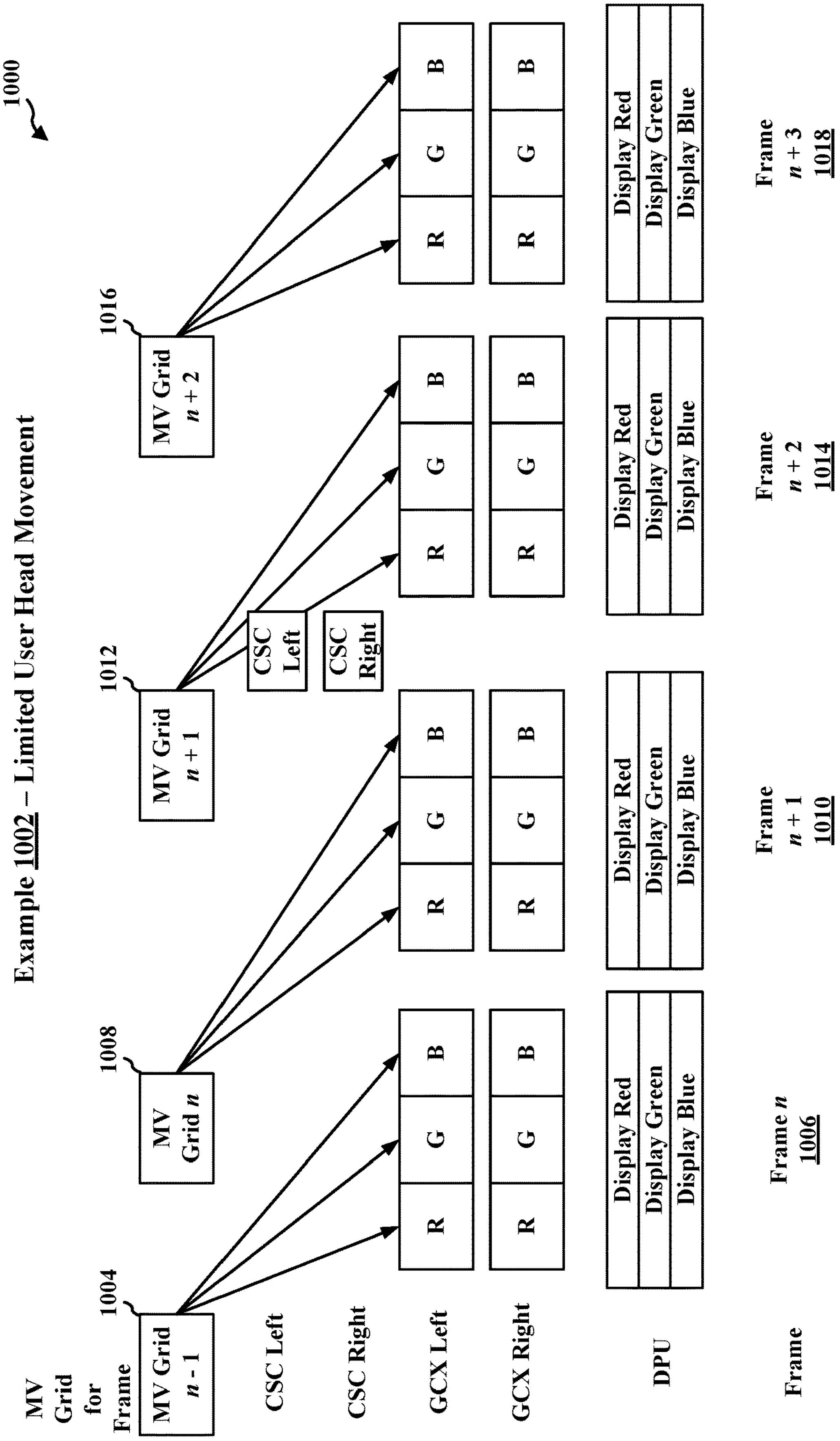
FIG. 10 is a diagram illustrating an example of aspects pertaining to a GPU timeout framework with limited user head movement in accordance with one or more techniques of this disclosure.

FIG. 10 is a diagram 1000 illustrating an example 1002 of aspects pertaining to a GPU timeout framework with limited user head movement in accordance with one or more techniques of this disclosure. The example 1002 may pertain to 926 in FIG. 9. For instance, a visual analytics engine may determine that limited head movement of a user has occurred. As depicted in the diagram 1000, the visual analytics engine may reuse MV grid n−1 1004 (for an n−1frame (not depicted in the diagram 1000) to reproject a color field (e.g., R, G, B, etc.) for frame n 1006, where n is an integer. Similarly, the visual analytics engine may reuse MV grid n 1008 (for frame n 1006) to reproject frame n+1 1010, MV grid n+1 1012 to reproject frame n+2 1014, and MV grid n+2 1016 to reproject frame n+3 1018.

Figure 11:
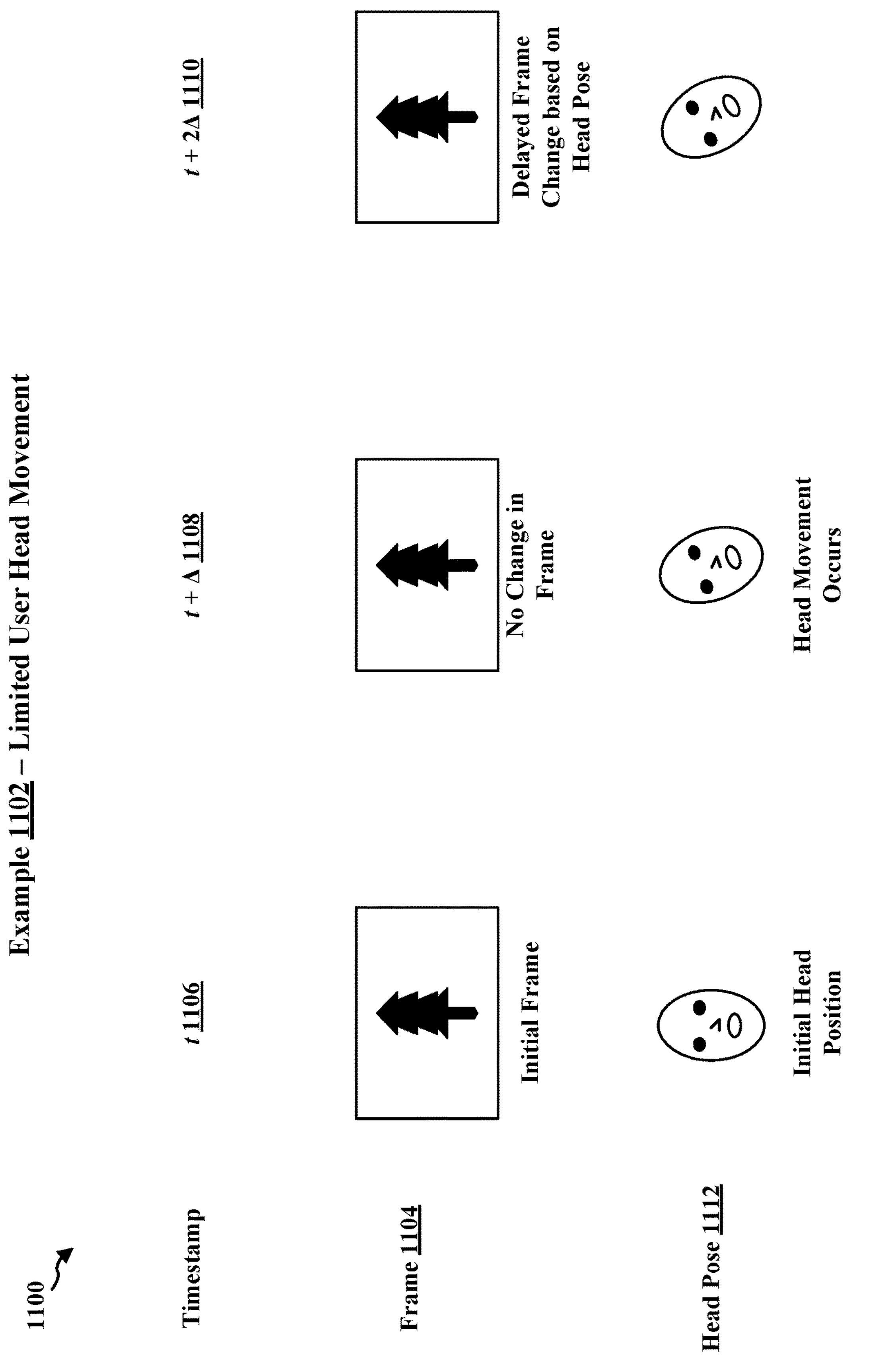
FIG. 11 is a diagram illustrating an example of aspects pertaining to a GPU timeout framework with limited user head movement in accordance with one or more techniques of this disclosure.

FIG. 11 is a diagram 1100 illustrating an example 1102 of aspects pertaining to a GPU timeout framework with limited user head movement in accordance with one or more techniques of this disclosure. The example 1102 may pertain to 926 in FIG. 9. The diagram 1100 depicts a frame 1104 at time stamp t 1106, at time stamp t+β 1108, and at time stamp t+2β 1110, where t and β are numbers. The diagram 1100 also depicts a head pose 1112 of a user at time stamp t 1106, at time stamp t+β 1108, and at time stamp t+2β 1110. As described above with respect to FIG. 9 and FIG. 10, a visual analytics engine may reuse MV grids for prior frames when there is limited head movement of the user.

Figure 12:
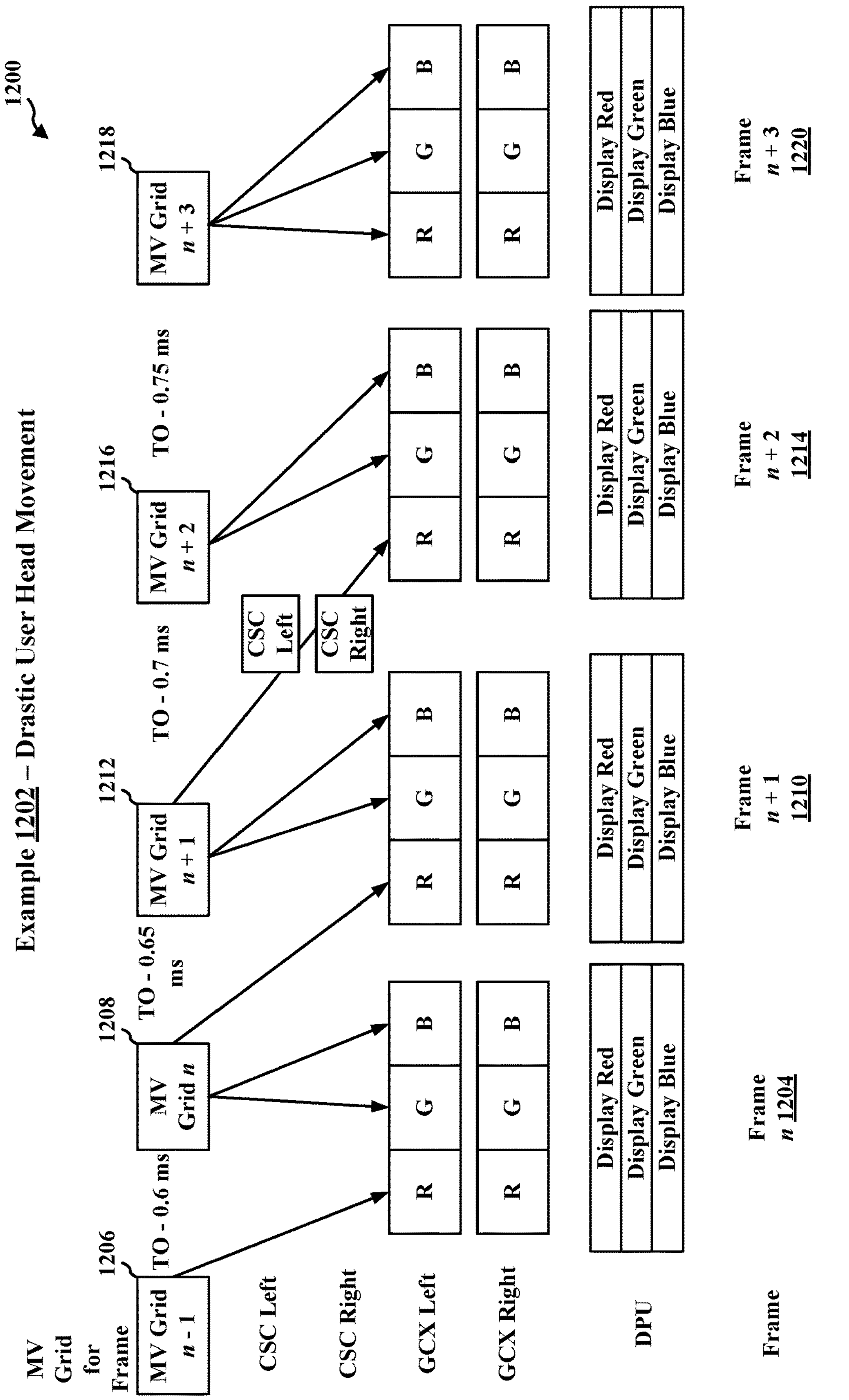
FIG. 12 is a diagram illustrating an example of aspects pertaining to a GPU timeout framework with drastic user head movement in accordance with one or more techniques of this disclosure.

FIG. 12 is a diagram 1200 illustrating an example 1202 of aspects pertaining to a GPU timeout framework with drastic user head movement in accordance with one or more techniques of this disclosure. The example 1202 may pertain to 928 in FIG. 9. In the example 1202, a timeout value for an R color field (e.g., R) may initially be 0.6 ms. In the example 1202, a timeout may occur with respect to the R color field, but not a G color field (e.g., G) or a B color field (e.g., B) of frame n 1204. A visual analytics engine may determine that drastic head movement of a user has occurred as described above. The visual analytics engine may use MV grid n−1 1206 (for frame n−1 (not depicted in FIG. 12)) to reproject the R color field of frame n 1204. The visual analytics engine may use MV grid n 1208 to reproject the G color field and/or the B color field of frame n 1204. As described above, the visual analytics engine may increment the timeout value for the R field from 0.6 ms to 0.65 ms.

A timeout may again occur with respect to an R color field (e.g., R), but not a G color field (e.g., G) or a B color field (e.g., B) of frame n+1 1210. The visual analytics engine may determine that drastic head movement of a user has occurred as described above. The visual analytics engine may use MV grid n 1208 (for frame n 1204) to reproject the R color field of frame n+1 1210. The visual analytics engine may use MV grid n+1 1212 to reproject the G color field and/or the B color field of frame n+1 1210. As described above, the visual analytics engine may increment the timeout value for the R field from 0.65 ms to 0.7 ms.

A timeout may again occur with respect to an R color field (e.g., R), but not a G color field (e.g., G) or a B color field (e.g., B) of frame n+2 1214. The visual analytics engine may determine that drastic head movement of a user has occurred as described above. The visual analytics engine may use MV grid n+1 1212 (for frame n+1 1210) to reproject the R color field of frame n+2 1214. The visual analytics engine may use MV grid n+2 1216 to reproject the G color field and/or the B color field of frame n+2 1214. As described above, the visual analytics engine may increment the timeout value for the R field from 0.7 ms to 0.75 ms.

When the timeout value for the R field is set to 0.75 ms, a timeout may no longer be observed by the visual analytics engine. As such, the visual analytics engine may use MV grid n+3 1218 to reproject frame n+3 1220. As illustrated in the example 1202, by incrementing a timeout value for a color field, the visual analytics engine may determine a timeout value that provides the GPU with sufficient time to generate a MV grid while at the same time maintaining a relatively high frame rate.

The above-described technologies may be implemented on an AR chipset. For example, the above-described technologies may be implemented in an AR chipset in which a GPU does not have a recurring workload. The above-described technologies may be utilized in scenarios in which a GPU may take on more or less computational loads based on a use case. The above-described technologies may help in mitigating quality issues when the GPU is under a heavy load. The above-described technologies (i.e., a dynamic GPU timeout algorithm) may be implemented in hardware.

Figure 13:
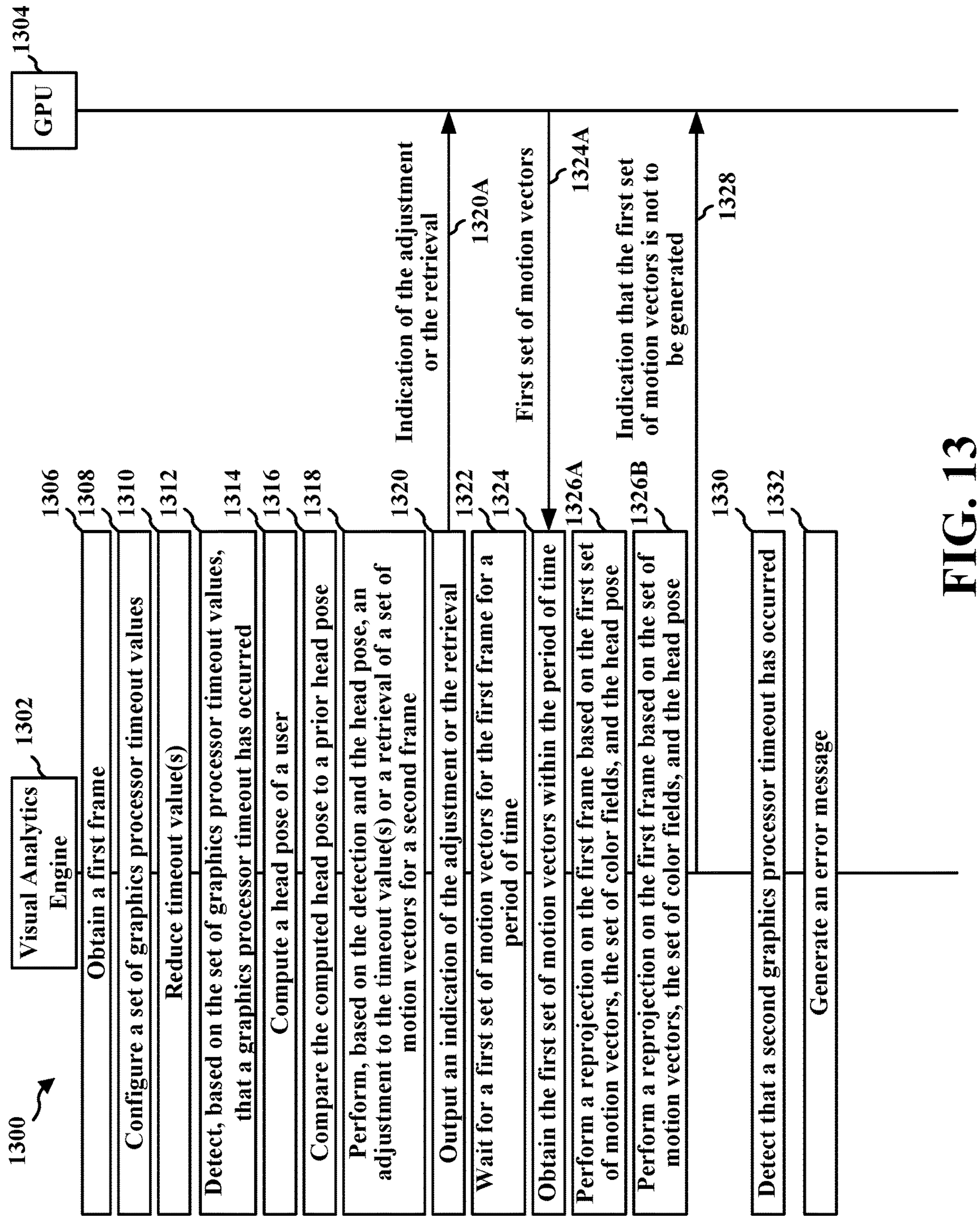
FIG. 13 is a call flow diagram illustrating example communications between a visual analytics engine and a GPU in accordance with one or more techniques of this disclosure.

FIG. 13 is a call flow diagram 1300 illustrating example communications between a visual analytics engine 1302 and a GPU 1304 in accordance with one or more techniques of this disclosure. In an example, the visual analytics engine 1302 and the GPU 1304 may be included in the device 104, the XR device 402, or the WDD 604. In an example, the visual analytics engine 1302 may be or include the visual analytics engine FW 708 or the VA engine FW 818 and the GPU 1304 may be or include the GPU 814 and/or the GPU FW 816. The visual analytics engine 1302 may be implemented in hardware.

At 1306, the visual analytics engine 1302 may obtain a first frame. At 1308, the visual analytics engine 1302 may configure a set of graphics processor timeout values for a set of color fields for the first frame, where a sum of the set of graphics processor timeout values is less than or equal to a threshold graphics processor timeout value. At 1312, the visual analytics engine 1302 may detect, based on the set of graphics processor timeout values, that a graphics processor timeout has occurred with respect to at least one color field in the set of color fields. At 1318, the visual analytics engine 1302 may perform, based on the detection and a head pose of a user, (1) an adjustment to at least one timeout value in the set of graphics processor timeout values such that the sum of the set of graphics processor timeout values remains less than or equal to the threshold graphics processor timeout value or (2) a retrieval of a set of motion vectors for a second frame, where the second frame is prior to the first frame. At 1320, the visual analytics engine 1302 may output an indication of the adjustment to the at least one timeout value or the retrieval of the set of motion vectors. For example, at 1320A, the visual analytics engine 1302 may output the indication of the adjustment to the at least one timeout value or the retrieval of the set of motion vectors to the GPU 1304.

At 1314, the visual analytics engine 1302 may compute the head pose of the user based on data generated by a wearable display device worn by the user, where performing the adjustment to the at least one timeout value or the retrieval of the set of motion vectors at 1318 may include performing, based on the computed head pose, the adjustment to the at least one timeout value or the retrieval of the set of motion vectors.

At 1316, the visual analytics engine 1302 may compare the computed head pose of the user to a prior head pose of the user, where performing the adjustment to the at least one timeout value or the retrieval of the set of motion vectors at 1318 may include performing, based on the comparison, the adjustment to the at least one timeout value or the retrieval of the set of motion vectors.

In one aspect, performing the adjustment to the at least one timeout value or the retrieval of the set of motion vectors at 1318 may include performing the adjustment to the at least one timeout value, and at 1322, the visual analytics engine 1302 may wait for a first set of motion vectors for the first frame for a period of time, where the period of time may be based on the adjustment to the at least one timeout value. At 1324, the visual analytics engine 1302 may obtain the first set of motion vectors within the period of time. For instance, at 1324A, the visual analytics engine 1302 may receive the first set of motion vectors within the period of time from the GPU 1304. At 1326A, the visual analytics engine 1302 may perform a reprojection on the first frame based on the first set of motion vectors, the set of color fields, and the head pose of the user.

In one aspect, performing the adjustment to the at least one timeout value or the retrieval of the set of motion vectors at 1318 may include performing the retrieval of the set of motion vectors, and at 1326B, the visual analytics engine 1302 may perform a reprojection on the first frame based on the set of motion vectors, the set of color fields, and the head pose of the user.

In one aspect, configuring the set of graphics processor timeout values at 1308 may include configuring the set of graphics processor timeout values such that the sum of the set of graphics processor timeout values is equal to the threshold graphics processor timeout value, and at 1310, the visual analytics engine 1302 may reduce the at least one timeout value in the set of graphics processor timeout values, where detecting that the graphics processor timeout has occurred with respect to the at least one color field at 1312 may be based on the reduction.

In one aspect, performing the adjustment to the at least one timeout value or the retrieval of the set of motion vectors at 1318 may include performing the retrieval of the set of motion vectors, and at 1328, the visual analytics engine 1302 may transmit (e.g., to the GPU 1304) an indication that a first set of motion vectors for the first frame is not to be generated.

In one aspect, performing the adjustment to the at least one timeout value or the retrieval of the set of motion vectors at 1318 may include performing the adjustment to the at least one timeout value, where performing the adjustment to the at least one timeout value at 1318 may include adjusting the at least one timeout value in the set of graphics processor timeout values incrementally until the sum of the set of graphics processor timeout values is equal to the threshold graphics processor timeout value, and at 1330, the visual analytics engine 1302 may detect that a second graphics processor timeout has occurred with respect to the at least one color field. At 1332, the visual analytics engine 1302 may generate an error message based on the detection that the second graphics processor timeout has occurred with respect to the at least one color field.

Figure 14:
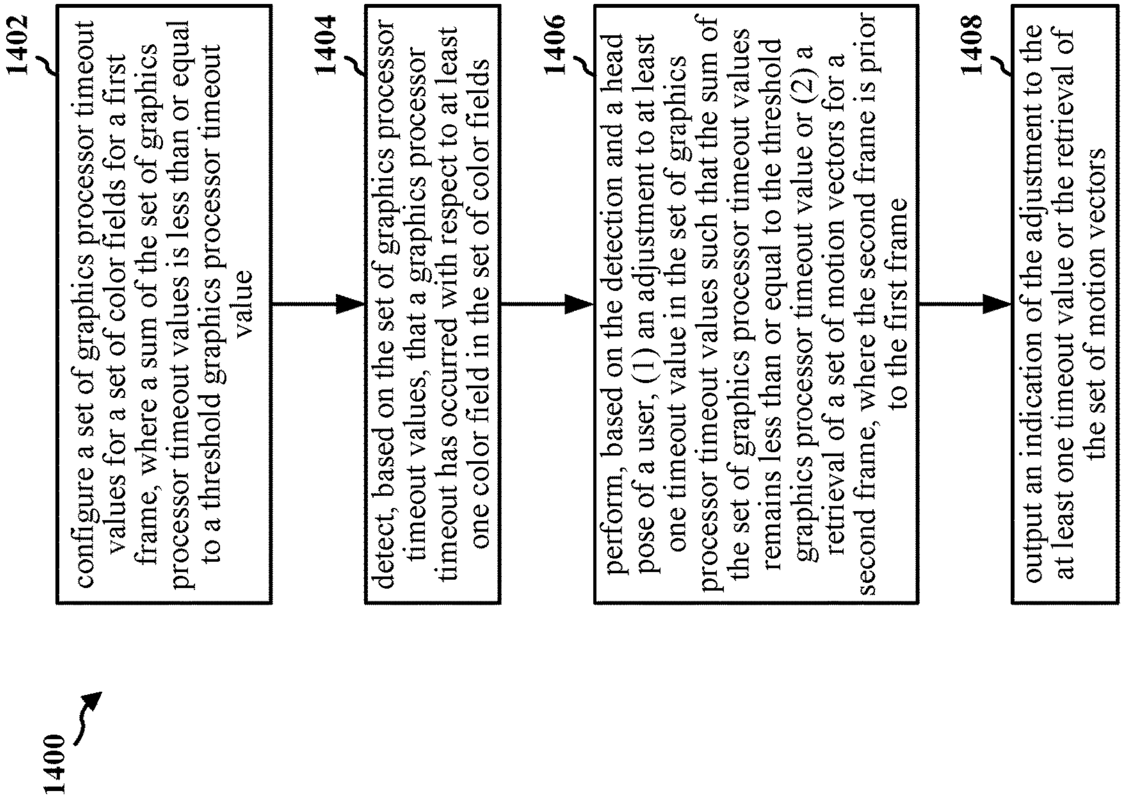
FIG. 14 is a flowchart of an example method of graphics processing in accordance with one or more techniques of this disclosure.

FIG. 14 is a flowchart 1400 of an example method of graphics processing in accordance with one or more techniques of this disclosure. The method may be performed by an apparatus, such as an apparatus for graphics processing, a GPU, a CPU, the device 104, the XR device 402, the WDD 604, a visual analytics engine (e.g., the visual analytics engine FW 708, the VA engine FW 818, the visual analytics engine 1302), a wireless communication device, and the like, as used in connection with the aspects of FIGS. 1-13. The method may be associated with various advantages at the apparatus, such as reducing or eliminating color bleeding in displayed frames. In an example, the method may be performed by the GPU timeout adjuster 198.

At 1402, the apparatus configures a set of graphics processor timeout values for a set of color fields for a first frame, where a sum of the set of graphics processor timeout values is less than or equal to a threshold graphics processor timeout value. For example, FIG. 13 at 1308 shows that the visual analytics engine 1302 may configure a set of graphics processor timeout values for a set of color fields for a first frame, where a sum of the set of graphics processor timeout values is less than or equal to a threshold graphics processor timeout value. In an example, the set of graphics processor timeout values may be or include the set of ToVs 920. In an example, the set of color fields may be or include the set of color fields 914. In an example, the first frame may be the frame 1104. In an example, the threshold graphics processor timeout value may be or include the threshold value 919. In an example, 1402 may be performed by the GPU timeout adjuster 198.

At 1404, the apparatus detects, based on the set of graphics processor timeout values, that a graphics processor timeout has occurred with respect to at least one color field in the set of color fields. For example, FIG. 13 at 1312 shows that the visual analytics engine 1302 may detect, based on the set of graphics processor timeout values, that a graphics processor timeout has occurred with respect to at least one color field in the set of color fields. In an example, the graphics processor timeout may correspond to 922 in FIG. 9. In an example, the at least one color field may be the R field 908, the G field 910, and/or the B field 912. In an example, 1404 may be performed by the GPU timeout adjuster 198.

At 1406, the apparatus performs, based on the detection and a head pose of a user, (1) an adjustment to at least one timeout value in the set of graphics processor timeout values such that the sum of the set of graphics processor timeout values remains less than or equal to the threshold graphics processor timeout value or (2) a retrieval of a set of motion vectors for a second frame, where the second frame is prior to the first frame. For example, FIG. 13 at 1318 shows that the visual analytics engine 1302 may perform, based on the detection and a head pose of a user, (1) an adjustment to at least one timeout value in the set of graphics processor timeout values such that the sum of the set of graphics processor timeout values remains less than or equal to the threshold graphics processor timeout value or (2) a retrieval of a set of motion vectors for a second frame, where the second frame is prior to the first frame. In an example, the user may be the user 412. In an example, the head pose of the user may be the head pose 1112. In an example, the adjustment may correspond to 928 in FIG. 9 and the retrieval may correspond to 926 in FIG. 9. In another example, the adjustment may correspond to the example 1202 and the retrieval may correspond to the example 1002. In an example, the set of motion vectors for the second frame may be the MV grid n−1 1004. In another example, the first frame may be frame n+1 1010 and the second frame may be frame n 1006. In an example, 1406 may be performed by the GPU timeout adjuster 198.

At 1408, the apparatus outputs an indication of the adjustment to the at least one timeout value or the retrieval of the set of motion vectors. For example, FIG. 13 at 1320 shows that the visual analytics engine 1302 may output an indication of the adjustment to the at least one timeout value or the retrieval of the set of motion vectors. In an example, 1408 may be performed by the GPU timeout adjuster 198.

Figure 15:
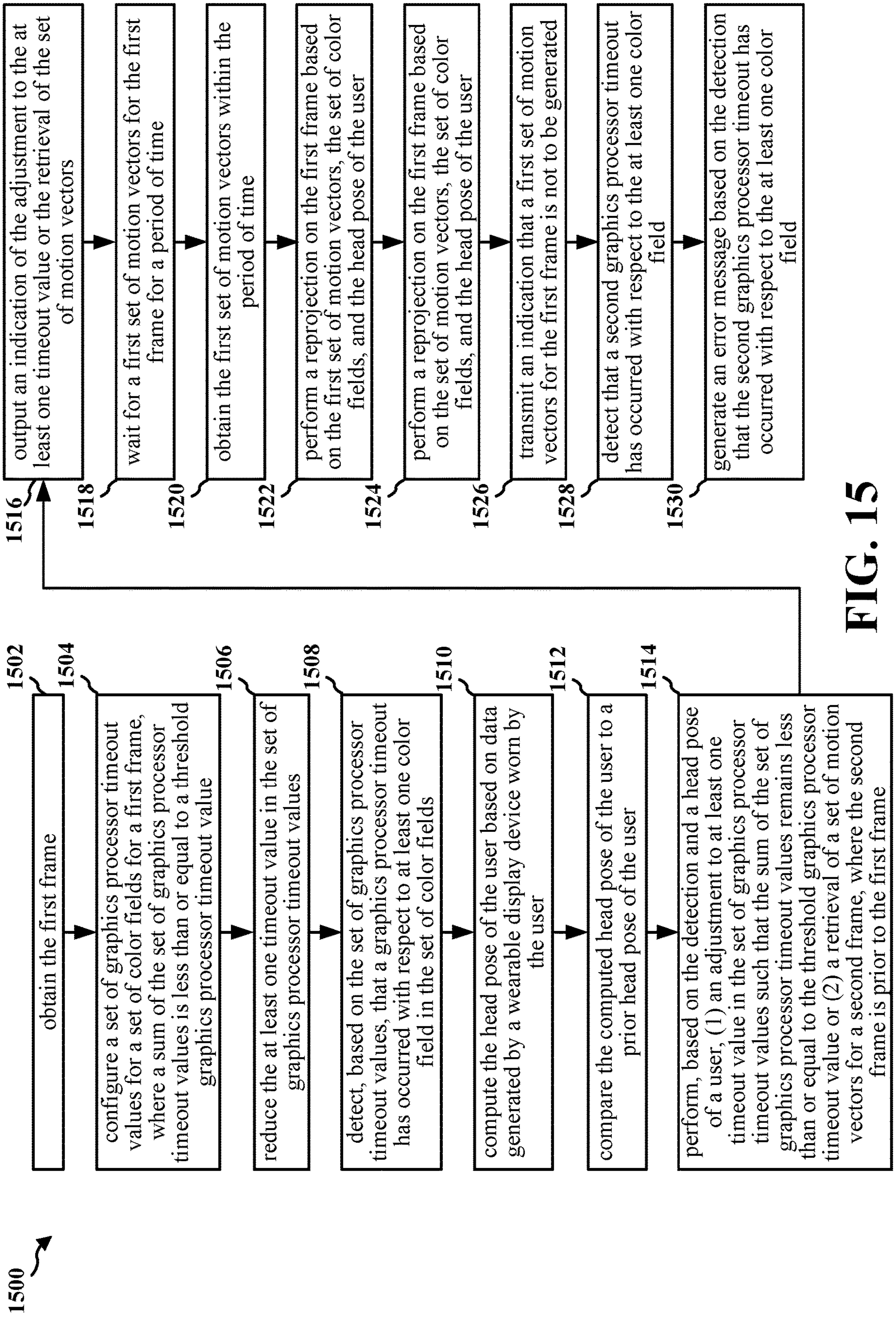
FIG. 15 is a flowchart of an example method of graphics processing in accordance with one or more techniques of this disclosure.

FIG. 15 is a flowchart 1500 of an example method of graphics processing in accordance with one or more techniques of this disclosure. The method may be performed by an apparatus, such as an apparatus for graphics processing, a GPU, a CPU, the device 104, the XR device 402, the WDD 604, a visual analytics engine (e.g., the visual analytics engine FW 708, the VA engine FW 818, the visual analytics engine 1302), a wireless communication device, and the like, as used in connection with the aspects of FIGS. 1-13. The method may be associated with various advantages at the apparatus, such as reducing or eliminating color bleeding in displayed frames. In an example, the method (including the various aspects detailed below) may be performed by the GPU timeout adjuster 198.

At 1504, the apparatus configures a set of graphics processor timeout values for a set of color fields for a first frame, where a sum of the set of graphics processor timeout values is less than or equal to a threshold graphics processor timeout value. For example, FIG. 13 at 1308 shows that the visual analytics engine 1302 may configure a set of graphics processor timeout values for a set of color fields for a first frame, where a sum of the set of graphics processor timeout values is less than or equal to a threshold graphics processor timeout value. In an example, the set of graphics processor timeout values may be or include the set of ToVs 920. In an example, the set of color fields may be or include the set of color fields 914. In an example, the first frame may be the frame 1104. In an example, the threshold graphics processor timeout value may be or include the threshold value 919. In an example, 1504 may be performed by the GPU timeout adjuster 198.

At 1508, the apparatus detects, based on the set of graphics processor timeout values, that a graphics processor timeout has occurred with respect to at least one color field in the set of color fields. For example, FIG. 13 at 1312 shows that the visual analytics engine 1302 may detect, based on the set of graphics processor timeout values, that a graphics processor timeout has occurred with respect to at least one color field in the set of color fields. In an example, the graphics processor timeout may correspond to 922 in FIG. 9. In an example, the at least one color field may be the R field 908, the G field 910, and/or the B field 912. In an example, 1508 may be performed by the GPU timeout adjuster 198.

At 1514, the apparatus performs, based on the detection and a head pose of a user, (1) an adjustment to at least one timeout value in the set of graphics processor timeout values such that the sum of the set of graphics processor timeout values remains less than or equal to the threshold graphics processor timeout value or (2) a retrieval of a set of motion vectors for a second frame, where the second frame is prior to the first frame. For example, FIG. 13 at 1318 shows that the visual analytics engine 1302 may perform, based on the detection and a head pose of a user, (1) an adjustment to at least one timeout value in the set of graphics processor timeout values such that the sum of the set of graphics processor timeout values remains less than or equal to the threshold graphics processor timeout value or (2) a retrieval of a set of motion vectors for a second frame, where the second frame is prior to the first frame. In an example, the user may be the user 412. In an example, the head pose of the user may be the head pose 1112. In an example, the adjustment may correspond to 928 in FIG. 9 and the retrieval may correspond to 926 in FIG. 9. In another example, the adjustment may correspond to the example 1202 and the retrieval may correspond to the example 1002. In an example, the set of motion vectors for the second frame may be the MV grid n−1 1004. In another example, the first frame may be frame n+1 1010 and the second frame may be frame n 1006. In an example, 1514 may be performed by the GPU timeout adjuster 198.

At 1516, the apparatus outputs an indication of the adjustment to the at least one timeout value or the retrieval of the set of motion vectors. For example, FIG. 13 at 1320 shows that the visual analytics engine 1302 may output an indication of the adjustment to the at least one timeout value or the retrieval of the set of motion vectors. In an example, 1516 may be performed by the GPU timeout adjuster 198.

In one aspect, performing the adjustment to the at least one timeout value may include increasing the at least one timeout value such that the sum of the set of graphics processor timeout values remains less than or equal to the threshold graphics processor timeout value. For example, performing the adjustment to the at least one timeout value at 1318 may include increasing the at least one timeout value such that the sum of the set of graphics processor timeout values remains less than or equal to the threshold graphics processor timeout value.

In one aspect, outputting the indication of the adjustment to the at least one timeout value or the retrieval of the set of motion vectors may include: transmitting the indication of the adjustment to the at least one timeout value or the retrieval of the set of motion vectors; or storing, in at least one of a buffer, a memory, or a cache, the indication of the adjustment to the at least one timeout value or the retrieval of the set of motion vectors. For example, outputting the indication of the adjustment to the at least one timeout value or the retrieval of the set of motion vectors at 1320 may include: transmitting the indication of the adjustment to the at least one timeout value or the retrieval of the set of motion vectors; or storing, in at least one of a buffer, a memory, or a cache, the indication of the adjustment to the at least one timeout value or the retrieval of the set of motion vectors. For example, FIG. 13 at 1320A shows that the visual analytics engine 1302 may transmit the indication of the adjustment to the at least one timeout value or the retrieval of the set of motion vectors.

In one aspect, at 1510, the apparatus may compute the head pose of the user based on data generated by a wearable display device worn by the user, where performing the adjustment to the at least one timeout value or the retrieval of the set of motion vectors may include performing, based on the computed head pose, the adjustment to the at least one timeout value or the retrieval of the set of motion vectors. For example, FIG. 13 at 1314 shows that the visual analytics engine 1302 may compute the head pose of the user based on data generated by a wearable display device worn by the user, where performing the adjustment to the at least one timeout value or the retrieval of the set of motion vectors at 1318 may include performing, based on the computed head pose, the adjustment to the at least one timeout value or the retrieval of the set of motion vectors. In an example, the wearable display device may be or include the XR device 402 or the WDD 604. In an example, 1510 may be performed by the GPU timeout adjuster 198.

In one aspect, at 1512, the apparatus may compare the computed head pose of the user to a prior head pose of the user, where performing the adjustment to the at least one timeout value or the retrieval of the set of motion vectors may include performing, based on the comparison, the adjustment to the at least one timeout value or the retrieval of the set of motion vectors. For example, FIG. 13 at 1316 shows that the visual analytics engine 1302 may compare the computed head pose of the user to a prior head pose of the user, where performing the adjustment to the at least one timeout value or the retrieval of the set of motion vectors at 1318 may include performing, based on the comparison, the adjustment to the at least one timeout value or the retrieval of the set of motion vectors. In an example, the head pose may correspond to the head pose at time stamp t+β 1108 and the prior head pose may correspond to the head pose 1112 at time stamp t 1106. In an example, the aforementioned aspect may correspond to 924 in FIG. 9. In an example, 1512 may be performed by the GPU timeout adjuster 198.

In one aspect, performing the adjustment to the at least one timeout value or the retrieval of the set of motion vectors may include performing the adjustment to the at least one timeout value based on the comparison indicating that a difference between the computed head pose and the prior head pose is greater than a threshold difference. For example, the aforementioned aspect may correspond to 928 in FIG. 9.

In one aspect, performing the adjustment to the at least one timeout value or the retrieval of the set of motion vectors may include performing the retrieval of the set of motion vectors based on the comparison indicating that a difference between the computed head pose and the prior head pose is less than a threshold difference. For example, the aforementioned aspect may correspond to 926 in FIG. 9.

In one aspect, performing the adjustment to the at least one timeout value or the retrieval of the set of motion vectors may include performing the adjustment to the at least one timeout value, and at 1518, the apparatus may wait for a first set of motion vectors for the first frame for a period of time, where the period of time is based on the adjustment to the at least one timeout value. For example, performing the adjustment to the at least one timeout value or the retrieval of the set of motion vectors at 1318 may include performing the adjustment to the at least one timeout value, and FIG. 13 at 1322 shows that the visual analytics engine 1302 may wait for a first set of motion vectors for the first frame for a period of time, where the period of time is based on the adjustment to the at least one timeout value. In an example, 1518 may be performed by the GPU timeout adjuster 198.

In one aspect, at 1520, the apparatus may obtain the first set of motion vectors within the period of time. For example, FIG. 13 at 1324 shows that the visual analytics engine 1302 may obtain the first set of motion vectors within the period of time. In an example, the first set of motion vectors may correspond to the Nth frame MV grid 825. In an example, 1520 may be performed by the GPU timeout adjuster 198.

In one aspect, at 1522, the apparatus may perform a reprojection on the first frame based on the first set of motion vectors, the set of color fields, and the head pose of the user. For example, FIG. 13 at 1326A shows that the visual analytics engine 1302 may perform a reprojection on the first frame based on the first set of motion vectors, the set of color fields, and the head pose of the user. In an example, the reprojection may correspond to 706. In an example, the reprojection may correspond to the reprojection flow 802. In an example, 1522 may be performed by the GPU timeout adjuster 198.

In one aspect, performing the adjustment to the at least one timeout value or the retrieval of the set of motion vectors may include performing the retrieval of the set of motion vectors, and at 1524, the apparatus may perform a reprojection on the first frame based on the set of motion vectors, the set of color fields, and the head pose of the user. For example, performing the adjustment to the at least one timeout value or the retrieval of the set of motion vectors may include performing the retrieval of the set of motion vectors, and FIG. 13 at 1326B shows that the visual analytics engine 1302 may perform a reprojection on the first frame based on the set of motion vectors, the set of color fields, and the head pose of the user. In an example, the reprojection may correspond to 706. In an example, the reprojection may correspond to the reprojection flow 802. In an example, the set of motion vectors may correspond to the (N−1) th frame MV grid 826. In an example, 1524 may be performed by the GPU timeout adjuster 198.

In one aspect, the set of color fields may include a red color field, a green color field, and a blue color field. For example, the set of color fields may include the R field 908, the G field 910, and the B field 912.

In one aspect, performing the adjustment to the at least one timeout value may include incrementally adjusting the at least one timeout value based on a step size until graphics processor timeouts with respect to the at least one color field are no longer detected. For example, performing the adjustment to the at least one timeout value at 1318 may include incrementally adjusting the at least one timeout value based on a step size until graphics processor timeouts with respect to the at least one color field are no longer detected. As used herein, a step size may refer to a value by which a timeout value is increased or decreased. In an example, the aforementioned aspect may correspond to the example 1202.

In one aspect, configuring the set of graphics processor timeout values may include configuring the set of graphics processor timeout values such that the sum of the set of graphics processor timeout values is equal to the threshold graphics processor timeout value, and at 1506, the apparatus may reduce the at least one timeout value in the set of graphics processor timeout values, where detecting that the graphics processor timeout has occurred with respect to the at least one color field may be based on the reduction. For example, configuring the set of graphics processor timeout values at 1308 may include configuring the set of graphics processor timeout values such that the sum of the set of graphics processor timeout values is equal to the threshold graphics processor timeout value, and FIG. 13 at 1310 shows that visual analytics engine 1302 may reduce the at least one timeout value in the set of graphics processor timeout values, where detecting that the graphics processor timeout has occurred with respect to the at least one color field at 1312 may be based on the reduction. In an example, 1506 may be performed by the GPU timeout adjuster 198.

In one aspect, performing the adjustment to the at least one timeout value or the retrieval of the set of motion vectors may include performing the retrieval of the set of motion vectors, and at 1526, the apparatus may transmit an indication that a first set of motion vectors for the first frame is not to be generated. For example, performing the adjustment to the at least one timeout value or the retrieval of the set of motion vectors at 1318 may include performing the retrieval of the set of motion vectors, and FIG. 13 at 1328 shows that the visual analytics engine 1302 may transmit an indication (e.g., to the GPU 1304) that a first set of motion vectors for the first frame is not to be generated. In an example, 1526 may be performed by the GPU timeout adjuster 198.

In one aspect, performing the adjustment to the at least one timeout value or the retrieval of the set of motion vectors may include performing the adjustment to the at least one timeout value, where performing the adjustment to the at least one timeout value may include adjusting the at least one timeout value in the set of graphics processor timeout values incrementally until the sum of the set of graphics processor timeout values is equal to the threshold graphics processor timeout value, and at 1528, the apparatus may detect that a second graphics processor timeout has occurred with respect to the at least one color field. For example, performing the adjustment to the at least one timeout value or the retrieval of the set of motion vectors at 1318 may include performing the adjustment to the at least one timeout value, where performing the adjustment to the at least one timeout value may include adjusting the at least one timeout value in the set of graphics processor timeout values incrementally until the sum of the set of graphics processor timeout values is equal to the threshold graphics processor timeout value, and FIG. 13 at 1330 shows that the visual analytics engine 1302 may detect that a second graphics processor timeout has occurred with respect to the at least one color field. In an example, 1528 may be performed by the GPU timeout adjuster 198.

In one aspect, at 1530, the apparatus may generate an error message based on the detection that the second graphics processor timeout has occurred with respect to the at least one color field. For example, FIG. 13 at 1332 shows that visual analytics engine 1302 may generate an error message based on the detection that the second graphics processor timeout has occurred with respect to the at least one color field. In an example, 1530 may be performed by the GPU timeout adjuster 198.

In one aspect, the first frame may correspond to at least one of extended reality (XR) content, augmented reality (AR) content, mixed reality (MR) content, or virtual reality (VR) content. For example, the first frame may be or include the frame 1104, and the frame 1104 may correspond to at least one of extended reality (XR) content, augmented reality (AR) content, mixed reality (MR) content, or virtual reality (VR) content.

In one aspect, at 1502, the apparatus may obtain the first frame. For example, FIG. 13 at 1306 shows that the visual analytics engine 1302 may obtain the first frame (e.g., from the GPU 1304). In an example, 1502 may be performed by the GPU timeout adjuster 198.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for configuring a set of graphics processor timeout values for a set of color fields for a first frame, where a sum of the set of graphics processor timeout values is less than or equal to a threshold graphics processor timeout value. The apparatus may further include means for detecting, based on the set of graphics processor timeout values, that a graphics processor timeout has occurred with respect to at least one color field in the set of color fields. The apparatus may further include means for performing, based on the detection and a head pose of a user, (1) an adjustment to at least one timeout value in the set of graphics processor timeout values such that the sum of the set of graphics processor timeout values remains less than or equal to the threshold graphics processor timeout value or (2) a retrieval of a set of motion vectors for a second frame, where the second frame is prior to the first frame. The apparatus may further include means for outputting an indication of the adjustment to the at least one timeout value or the retrieval of the set of motion vectors. The apparatus may further include means for computing the head pose of the user based on data generated by a wearable display device worn by the user, where performing the adjustment to the at least one timeout value or the retrieval of the set of motion vectors includes performing, based on the computed head pose, the adjustment to the at least one timeout value or the retrieval of the set of motion vectors. The apparatus may further include means for comparing the computed head pose of the user to a prior head pose of the user, where performing the adjustment to the at least one timeout value or the retrieval of the set of motion vectors includes performing, based on the comparison, the adjustment to the at least one timeout value or the retrieval of the set of motion vectors. The apparatus may further include means for waiting for a first set of motion vectors for the first frame for a period of time, where the period of time is based on the adjustment to the at least one timeout value. The apparatus may further include means for obtaining the first set of motion vectors within the period of time. The apparatus may further include means for performing a reprojection on the first frame based on the first set of motion vectors, the set of color fields, and the head pose of the user. The apparatus may further include means for performing a reprojection on the first frame based on the set of motion vectors, the set of color fields, and the head pose of the user. The apparatus may further include means for reducing the at least one timeout value in the set of graphics processor timeout values, where detecting that the graphics processor timeout has occurred with respect to the at least one color field is based on the reduction. The apparatus may further include means for transmitting an indication that a first set of motion vectors for the first frame is not to be generated. The apparatus may further include means for detecting that a second graphics processor timeout has occurred with respect to the at least one color field. The apparatus may further include means for generating an error message based on the detection that the second graphics processor timeout has occurred with respect to the at least one color field. The apparatus may further include means for obtaining the first frame.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects.

Unless specifically stated otherwise, the term “some” refers to one or more and the term “or” may be interpreted as “and/or” where context does not dictate otherwise. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C,” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.” Unless stated otherwise, the phrase “a processor” may refer to “any of one or more processors” (e.g., one processor of one or more processors, a number (greater than one) of processors in the one or more processors, or all of the one or more processors) and the phrase “a memory” may refer to “any of one or more memories” (e.g., one memory of one or more memories, a number (greater than one) of memories in the one or more memories, or all of the one or more memories).

In one or more examples, the functions described herein may be implemented in hardware, software, firmware, or any combination thereof. For example, although the term “processing unit” has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term “processor,” as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, including: configuring a set of graphics processor timeout values for a set of color fields for a first frame, wherein a sum of the set of graphics processor timeout values is less than or equal to a threshold graphics processor timeout value; detecting, based on the set of graphics processor timeout values, that a graphics processor timeout has occurred with respect to at least one color field in the set of color fields; performing, based on the detection and a head pose of a user, (1) an adjustment to at least one timeout value in the set of graphics processor timeout values such that the sum of the set of graphics processor timeout values remains less than or equal to the threshold graphics processor timeout value or (2) a retrieval of a set of motion vectors for a second frame, wherein the second frame is prior to the first frame; and outputting an indication of the adjustment to the at least one timeout value or the retrieval of the set of motion vectors.

Aspect 2 may be combined with aspect 1, wherein performing the adjustment to the at least one timeout value includes increasing the at least one timeout value such that the sum of the set of graphics processor timeout values remains less than or equal to the threshold graphics processor timeout value.

Aspect 3 may be combined with any of aspects 1-2, wherein outputting the indication of the adjustment to the at least one timeout value or the retrieval of the set of motion vectors includes: transmitting the indication of the adjustment to the at least one timeout value or the retrieval of the set of motion vectors; or storing, in at least one of a buffer, a memory, or a cache, the indication of the adjustment to the at least one timeout value or the retrieval of the set of motion vectors.

Aspect 4 may be combined with any of aspects 1-3, further including: computing the head pose of the user based on data generated by a wearable display device worn by the user, wherein performing the adjustment to the at least one timeout value or the retrieval of the set of motion vectors includes performing, based on the computed head pose, the adjustment to the at least one timeout value or the retrieval of the set of motion vectors.

Aspect 5 may be combined with aspect 4, further including: comparing the computed head pose of the user to a prior head pose of the user, wherein performing the adjustment to the at least one timeout value or the retrieval of the set of motion vectors includes performing, based on the comparison, the adjustment to the at least one timeout value or the retrieval of the set of motion vectors.

Aspect 6 may be combined with aspect 5, wherein performing the adjustment to the at least one timeout value or the retrieval of the set of motion vectors includes performing the adjustment to the at least one timeout value based on the comparison indicating that a difference between the computed head pose and the prior head pose is greater than a threshold difference.

Aspect 7 may be combined with aspect 5, wherein performing the adjustment to the at least one timeout value or the retrieval of the set of motion vectors includes performing the retrieval of the set of motion vectors based on the comparison indicating that a difference between the computed head pose and the prior head pose is less than a threshold difference.

Aspect 8 may be combined with any of aspects 1-6, wherein performing the adjustment to the at least one timeout value or the retrieval of the set of motion vectors includes performing the adjustment to the at least one timeout value, the method further including: waiting for a first set of motion vectors for the first frame for a period of time, wherein the period of time is based on the adjustment to the at least one timeout value; obtaining the first set of motion vectors within the period of time; and performing a reprojection on the first frame based on the first set of motion vectors, the set of color fields, and the head pose of the user.

Aspect 9 may be combined with any of aspects 1-5 and/or 7, wherein performing the adjustment to the at least one timeout value or the retrieval of the set of motion vectors includes performing the retrieval of the set of motion vectors, the method further including: performing a reprojection on the first frame based on the set of motion vectors, the set of color fields, and the head pose of the user.

Aspect 10 may be combined with any of aspects 1-9, wherein the set of color fields includes a red color field, a green color field, and a blue color field.

Aspect 11 may be combined with any of aspects 1-6, 8 and/or 10, wherein performing the adjustment to the at least one timeout value includes incrementally adjusting the at least one timeout value based on a step size until graphics processor timeouts with respect to the at least one color field are no longer detected.

Aspect 12 may be combined with any of aspects 1-11, wherein configuring the set of graphics processor timeout values includes configuring the set of graphics processor timeout values such that the sum of the set of graphics processor timeout values is equal to the threshold graphics processor timeout value, the method further including: reducing the at least one timeout value in the set of graphics processor timeout values, wherein detecting that the graphics processor timeout has occurred with respect to the at least one color field is based on the reduction.

Aspect 13 may be combined with any of aspects 1-5, 7, 9-10, and/or 12, wherein performing the adjustment to the at least one timeout value or the retrieval of the set of motion vectors includes performing the retrieval of the set of motion vectors, the method further including: transmitting an indication that a first set of motion vectors for the first frame is not to be generated.

Aspect 14 may be combined with any of aspects 1-6, 8, 10, and/or 12, wherein performing the adjustment to the at least one timeout value or the retrieval of the set of motion vectors includes performing the adjustment to the at least one timeout value, wherein performing the adjustment to the at least one timeout value includes adjusting the at least one timeout value in the set of graphics processor timeout values incrementally until the sum of the set of graphics processor timeout values is equal to the threshold graphics processor timeout value, the method further including: detecting that a second graphics processor timeout has occurred with respect to the at least one color field; and generating an error message based on the detection that the second graphics processor timeout has occurred with respect to the at least one color field.

Aspect 15 may be combined with any of aspects 1-14, wherein the first frame corresponds to at least one of extended reality (XR) content, augmented reality (AR) content, mixed reality (MR) content, or virtual reality (VR) content.

Aspect 16 is an apparatus for graphics processing including a memory and a processor coupled to the memory and, based on information stored in the memory, the processor is configured to implement a method as in any of aspects 1-15.

Aspect 17 may be combined with aspect 16 and includes that the apparatus is a wireless communication device comprising at least one of a transceiver or an antenna coupled to the processor, wherein the processor is configured to obtain the first frame via at least one of the transceiver or the antenna.

Aspect 18 is an apparatus for graphics processing including means for implementing a method as in any of aspects 1-15.

Aspect 19 is a computer-readable medium (e.g., a non-transitory computer-readable medium) storing computer executable code, the computer executable code, when executed by a processor, causes the processor to implement a method as in any of aspects 1-15.

Various aspects have been described herein. These and other aspects are within the scope of the following claims.

What is claimed is:

1. An apparatus for graphics processing, comprising:

a memory; and a processor coupled to the memory and, based on information stored in the memory, the processor is configured to:

configure a set of graphics processor timeout values for a set of color fields for a first frame, wherein a sum of the set of graphics processor timeout values is less than or equal to a threshold graphics processor timeout value;

detect, based on the set of graphics processor timeout values, that a graphics processor timeout has occurred with respect to at least one color field in the set of color fields;

perform, based on the detection and a head pose of a user, an adjustment to at least one timeout value in the set of graphics processor timeout values such that the sum of the set of graphics processor timeout values remains less than or equal to the threshold graphics processor timeout value; and output an indication of the adjustment to the at least one timeout value.

2. The apparatus of claim 1, wherein, to perform the adjustment to the at least one timeout value, the processor is configured to;

increase the at least one timeout value such that the sum of the set of graphics processor timeout values remains less than or equal to the threshold graphics processor timeout value.

3. The apparatus of claim 1, wherein, to output the indication of the adjustment to the at least one timeout value, the processor is configured to:

transmit the indication of the adjustment to the at least one timeout value; or store, in at least one of a buffer, the memory, or a cache, the indication of the adjustment to the at least one timeout value.

4. The apparatus of claim 1, wherein the processor is further configured to:

compute the head pose of the user based on data generated by a wearable display device worn by the user, wherein, to perform the adjustment to the timeout value, the processor is configured to;

perform, based on the computed head pose, the adjustment to the at least one timeout value.

5. The apparatus of claim 4, wherein the processor is further configured to:

compare the computed head pose of the user to a prior head pose of the user, wherein, to perform the adjustment to the at least one timeout value, the processor is configured to:

perform, based on the comparison, the adjustment to the at least one timeout value.

6. The apparatus of claim 5, wherein, to perform the adjustment to the at least one timeout value, the processor is configured to:

perform the adjustment to the at least one timeout value based on the comparison indicating that a difference between the computed head pose and the prior head pose is greater than a threshold difference.

7. The apparatus of claim 1, wherein the processor is further configured to:

compute the head pose of the user based on data generated by a wearable display device worn by the user;

compare the computed head pose of the user to a prior head pose of the user; and retrieve a set of motion vectors for a second frame based on the comparison indicating that a difference between the computed head pose and the prior head pose is less than a threshold difference, wherein the second frame is prior to the first frame.

8. The apparatus of claim 1, wherein the processor is further configured to:

wait for a first set of motion vectors for the first frame for a period of time, wherein the period of time is based on the adjustment to the at least one timeout value;

obtain the first set of motion vectors within the period of time; and perform a reprojection on the first frame based on the first set of motion vectors, the set of color fields, and the head pose of the user.

9. The apparatus of claim 1, wherein the processor is further configured to:

retrieve a set of motion vectors for a second frame, wherein the second frame is prior to the first frame; and perform a reprojection on the first frame based on the retrieved set of motion vectors, the set of color fields, and the head pose of the user.

10. The apparatus of claim 1, wherein the set of color fields comprises a red color field, a green color field, and a blue color field.

11. The apparatus of claim 1, wherein, to perform the adjustment to the at least one timeout value, the processor is configured to:

incrementally adjust the at least one timeout value based on a step size until graphics processor timeouts with respect to the at least one color field are no longer detected.

12. The apparatus of claim 1, wherein, to configure the set of graphics processor timeout values, the processor is configured to:

configure the set of graphics processor timeout values such that the sum of the set of graphics processor timeout values is equal to the threshold graphics processor timeout value, and wherein the processor is further configured to:

reduce the at least one timeout value in the set of graphics processor timeout values, wherein to detect that the graphics processor timeout has occurred with respect to the at least one color field, the processor is configured to detect that the graphics processor timeout has occurred further based on the reduction.

13. The apparatus of claim 1, wherein the processor is further configured to:

retrieve a set of motion vectors for a second frame, wherein the second frame is prior to the first frame; and transmit an indication that a first set of motion vectors for the first frame is not to be generated.

14. The apparatus of claim 1, wherein, to perform the adjustment to the at least one timeout value, the processor is configured to:

perform the adjustment to the at least one timeout value, wherein, to perform the adjustment to the at least one timeout value, the processor is configured to:

adjust the at least one timeout value in the set of graphics processor timeout values incrementally until the sum of the set of graphics processor timeout values is equal to the threshold graphics processor timeout value, and wherein the processor is further configured to:

detect that a second graphics processor timeout has occurred with respect to the at least one color field; and generate an error message based on the detection that the second graphics processor timeout has occurred with respect to the at least one color field.

15. The apparatus of claim 1, wherein the first frame corresponds to at least one of extended reality (XR) content, augmented reality (AR) content, mixed reality (MR) content, or virtual reality (VR) content.

16. The apparatus of claim 1, wherein the apparatus comprises a wireless communication device comprising at least one of a transceiver or an antenna coupled to the processor, and wherein the processor is further configured to;

obtain the first frame via at least one of the transceiver or the antenna.

17. A method of graphics processing, comprising:

configuring a set of graphics processor timeout values for a set of color fields for a first frame, wherein a sum of the set of graphics processor timeout values is less than or equal to a threshold graphics processor timeout value;

detecting, based on the set of graphics processor timeout values, that a graphics processor timeout has occurred with respect to at least one color field in the set of color fields;

performing, based on the detection and a head pose of a user, an adjustment to at least one timeout value in the set of graphics processor timeout values such that the sum of the set of graphics processor timeout values remains less than or equal to the threshold graphics processor timeout value; and outputting an indication of the adjustment to the at least one timeout value.

18. The method of claim 17, wherein performing the adjustment to the at least one timeout value comprises:

increasing the at least one timeout value such that the sum of the set of graphics processor timeout values remains less than or equal to the threshold graphics processor timeout value.

19. The method of claim 17, wherein outputting the indication of the adjustment to the at least one timeout value comprises:

transmitting the indication of the adjustment to the at least one timeout value; or storing, in at least one of a buffer, a memory, or a cache, the indication of the adjustment to the at least one timeout value.

20. A non-transitory computer-readable medium storing computer executable code, the computer executable code, when executed by a processor, causes the processor to:

configure a set of graphics processor timeout values for a set of color fields for a first frame, wherein a sum of the set of graphics processor timeout values is less than or equal to a threshold graphics processor timeout value;

detect, based on the set of graphics processor timeout values, that a graphics processor timeout has occurred with respect to at least one color field in the set of color fields;

perform, based on the detection and a head pose of a user, an adjustment to at least one timeout value in the set of graphics processor timeout values such that the sum of the set of graphics processor timeout values remains less than or equal to the threshold graphics processor timeout value; and output an indication of the adjustment to the at least one timeout value.

* * * * *